United States Patent
Feldman

(10) Patent No.: US 11,229,159 B1
(45) Date of Patent: *Jan. 25, 2022

(54) LEAF LIFTER DEVICE

(71) Applicant: Bruce Feldman, West Hartford, CT (US)

(72) Inventor: Bruce Feldman, West Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/571,156

(22) Filed: Sep. 15, 2019

Related U.S. Application Data

(60) Provisional application No. 62/919,777, filed on Mar. 28, 2019.

(51) Int. Cl.
*A01D 7/10* (2006.01)
*A01D 7/00* (2006.01)
*A01G 20/43* (2018.01)

(52) U.S. Cl.
CPC .............. *A01D 7/10* (2013.01); *A01D 7/00* (2013.01); *A01G 20/43* (2018.02)

(58) Field of Classification Search
CPC ............. A01D 7/00; A01D 7/10; A01G 20/43
USPC ......................................................... D8/3, 14
See application file for complete search history.

(56) References Cited

U.S. PATENT DOCUMENTS

| | | | | |
|---|---|---|---|---|
| 275,505 A | * | 4/1883 | Lindsey ............... | A01G 23/046 111/101 |
| 407,465 A | * | 7/1889 | Brick ................... | A01B 1/18 294/50.8 |
| 700,192 A | * | 5/1902 | Grummt ............... | A01B 1/18 294/50.8 |
| 1,514,863 A | * | 11/1924 | Rytell ................. | A01B 1/18 294/118 |
| 1,588,927 A | * | 6/1926 | Willis ................. | A01D 11/06 294/50.8 |

(Continued)

OTHER PUBLICATIONS

"Spear & Jackson Australia: Leaf Grabber", Web page <http://www.spearandjackson.com.au/products/SJ-LG1>, 2 pages, Mar. 26, 2015, retrieved from Internet Archive Wayback Machine <https://web.archive.org/web/20150326060409/http://www.spearandjackson.com.au/products/SJ-LG1> on Aug. 4, 2020 (Year: 2015).*

(Continued)

*Primary Examiner* — Thomas B Will
*Assistant Examiner* — Joan D Misa
(74) *Attorney, Agent, or Firm* — Brian S. Steinberger; Hilary F. Steinberger; Law Offices of Brian S. Steinberger, P.A.

(57) ABSTRACT

Devices, systems and methods having a pair of pivotable molded plastic substantially S shaped elongated arms with handle ends and opposite rake scooper ends. A user can manipulate the handle ends as tongs to pick up yard waste, such as but not limited to leaves, branches and the like, to be moved into yard waste containers, such as trashcans, leaf bags and the like. The pivot point of the pivoting arms is substantially twice as close to the handle ends than to the rake scooper ends to allow for greater leverage for picking up the yard waste. The higher pivotal point can form an approximately 3 to approximately 1 work ratio whereby spreading the handle ends of the device just approximately 11" or more apart allows for the rake scooper ends have spreads approximately 33", for maximizing debris collection.

11 Claims, 18 Drawing Sheets

(56) References Cited

U.S. PATENT DOCUMENTS

| | | | | |
|---|---|---|---|---|
| 1,761,503 A * | 6/1930 | Tonhardt | A01C 5/02 294/50.8 |
| 1,970,087 A * | 8/1934 | Gonsalves | A01C 5/02 111/101 |
| 2,751,245 A * | 6/1956 | Boyd | F24B 15/10 294/11 |
| 3,350,866 A * | 11/1967 | Spencer | A01D 7/00 56/400.12 |
| 3,654,754 A * | 4/1972 | Scoggin, Jr. | A01D 7/00 56/400.17 |
| 3,688,484 A * | 9/1972 | Cox | A01D 7/10 56/400.12 |
| 3,724,188 A * | 4/1973 | Eads | A01D 7/00 56/400.17 |
| 3,809,421 A * | 5/1974 | James | A47L 13/52 294/50.8 |
| 3,833,250 A * | 9/1974 | Lawrence | A01G 20/30 294/50.6 |
| D233,305 S * | 10/1974 | Eads | D8/13 |
| 4,037,397 A * | 7/1977 | Fiorentino | A01D 7/10 56/400.12 |
| 4,057,277 A * | 11/1977 | Burkholder | A01B 1/18 294/50.8 |
| 4,219,993 A * | 9/1980 | Cosmos | A01D 7/00 56/400.17 |
| 4,292,794 A * | 10/1981 | Gascon | A01D 7/10 294/50.9 |
| 4,378,670 A * | 4/1983 | Check | A01D 51/00 294/176 |
| 4,597,204 A * | 7/1986 | Heiden | E01H 5/02 15/144.1 |
| 4,667,458 A * | 5/1987 | Barrett | A01D 7/00 56/400.16 |
| 4,678,220 A * | 7/1987 | Gabriel | B66C 3/02 294/110.1 |
| 4,791,780 A * | 12/1988 | Phillips | A01D 7/00 294/52 |
| 4,831,815 A * | 5/1989 | Bonnes | A01D 7/06 56/400.17 |
| 4,866,922 A * | 9/1989 | Clark | A01D 7/00 56/400.04 |
| 4,991,386 A * | 2/1991 | Dirksen | A01D 7/00 294/50.8 |
| 5,042,812 A * | 8/1991 | Tillman | A63B 55/10 172/713 |
| 5,114,199 A * | 5/1992 | Newcomer | A01B 1/00 294/118 |
| D350,052 S * | 8/1994 | Sun | D8/13 |
| D359,207 S * | 6/1995 | Meiller | D8/13 |
| 5,459,988 A * | 10/1995 | Glaser | A01D 7/10 56/400.12 |
| D368,631 S * | 4/1996 | Swierczynski | D8/107 |
| D369,073 S * | 4/1996 | Sun | D8/13 |
| 5,564,266 A * | 10/1996 | Laughlin | A01D 7/10 294/50.8 |
| 5,564,267 A * | 10/1996 | Bricker | A01D 7/10 294/50.8 |
| D384,865 S * | 10/1997 | Baran | 294/50.8 |
| 5,687,556 A * | 11/1997 | Lintz | A01D 7/10 294/50.6 |
| D391,814 S * | 3/1998 | Lindsey | D8/13 |
| 5,901,540 A * | 5/1999 | Vella | A01D 7/10 294/50.6 |
| 6,120,073 A * | 9/2000 | Jones | A01D 51/00 294/118 |
| 6,463,727 B2 * | 10/2002 | Blyth | A01D 11/04 294/51 |
| D505,304 S * | 5/2005 | Conaway | D8/13 |
| 6,886,319 B2 * | 5/2005 | Nam | A01D 7/00 56/400.12 |
| D506,112 S * | 6/2005 | Roberson | D8/13 |
| 6,904,743 B2 * | 6/2005 | Vodinh | A01D 7/00 294/50.5 |
| 6,918,240 B2 * | 7/2005 | Hurt | A01D 7/00 56/400.04 |
| 7,168,230 B1 * | 1/2007 | Waddell | A01D 7/10 294/50.6 |
| D577,967 S * | 10/2008 | Norton | D8/13 |
| D579,289 S * | 10/2008 | Norton | D8/13 |
| D598,174 S * | 8/2009 | Lindberg | D15/28 |
| 7,644,532 B2 * | 1/2010 | Capio | A01K 63/006 43/11 |
| 7,661,258 B1 * | 2/2010 | Petruzelli | A01D 7/10 56/400.12 |
| D625,571 S * | 10/2010 | Frenkel | D8/13 |
| D634,593 S * | 3/2011 | Kavanagh | D8/4 |
| D701,097 S * | 3/2014 | Petruzzelli | D8/13 |
| D715,118 S * | 10/2014 | Wofford | D8/13 |
| 8,985,655 B2 * | 3/2015 | Kavanagh | B25B 7/00 294/118 |
| D726,515 S * | 4/2015 | Litwin | D8/13 |
| D766,682 S * | 9/2016 | Flournoy | D8/4 |
| D766,683 S * | 9/2016 | West | D8/4 |
| D769,683 S * | 10/2016 | Stein | D8/13 |
| 9,924,630 B2 * | 3/2018 | Kairys | A01D 7/10 |
| 10,137,564 B2 * | 11/2018 | Mazzocco | B25G 1/04 |
| D861,442 S * | 10/2019 | Rubinstein | D8/13 |
| D878,173 S * | 3/2020 | Lee | D8/13 |
| D889,920 S * | 7/2020 | Feldman | D8/10 |
| D891,206 S * | 7/2020 | Feldman | D8/13 |
| 2005/0188671 A1 * | 9/2005 | Conaway | A01D 7/00 56/400.18 |
| 2005/0206178 A1 * | 9/2005 | Hoeft | A01B 1/026 294/58 |
| 2007/0033916 A1 * | 2/2007 | Billado, Jr. | A01D 7/00 56/400.01 |
| 2010/0218476 A1 * | 9/2010 | Gosselin | A01D 7/10 56/400.16 |
| 2016/0278283 A1 * | 9/2016 | Hebert, Sr. | A01D 7/06 |
| 2020/0305359 A1 * | 10/2020 | Oakes | A01G 20/43 |

OTHER PUBLICATIONS

Leaf Grabber Long Handled, retrieved from http://www.castlehardware.com/catalog/834/product/12630/leafgr on Aug. 27, 2019, 2 pages.

3-in-1 Yellow Ergonomic Lightweight 17-Inch Lawn Leaf Grabber Claw Garden Pickup, retrieved from https://www.ebay.com/itm/3-in-1-Yellow-Ergonomic-Lightweight on Aug. 27, 2019, 4 pages.

Spear & Jackson, Leaf Grabber retrieved from http://www.spearandjack.com.au/products/SJ-LG 1 on Aug. 28, 2019, 1 page.

Gardman, Leaf grabber, retrieved from https://www.gardman.co.uk/leaf-grabber.html on Aug. 28, 2019, 2 pages.

UPP Long Handled Leaf Grabber, retrieved from https://www.upp-shop.de/en/upp-long-handled-leaf-grabber.html on Aug. 27, 2019, 6 pages.

Garden Grab X—The Ultimate Leaf and Garden Grabber, retrieved from http://gradengrabx.com on Aug. 27, 2019, 2 pages.

* cited by examiner

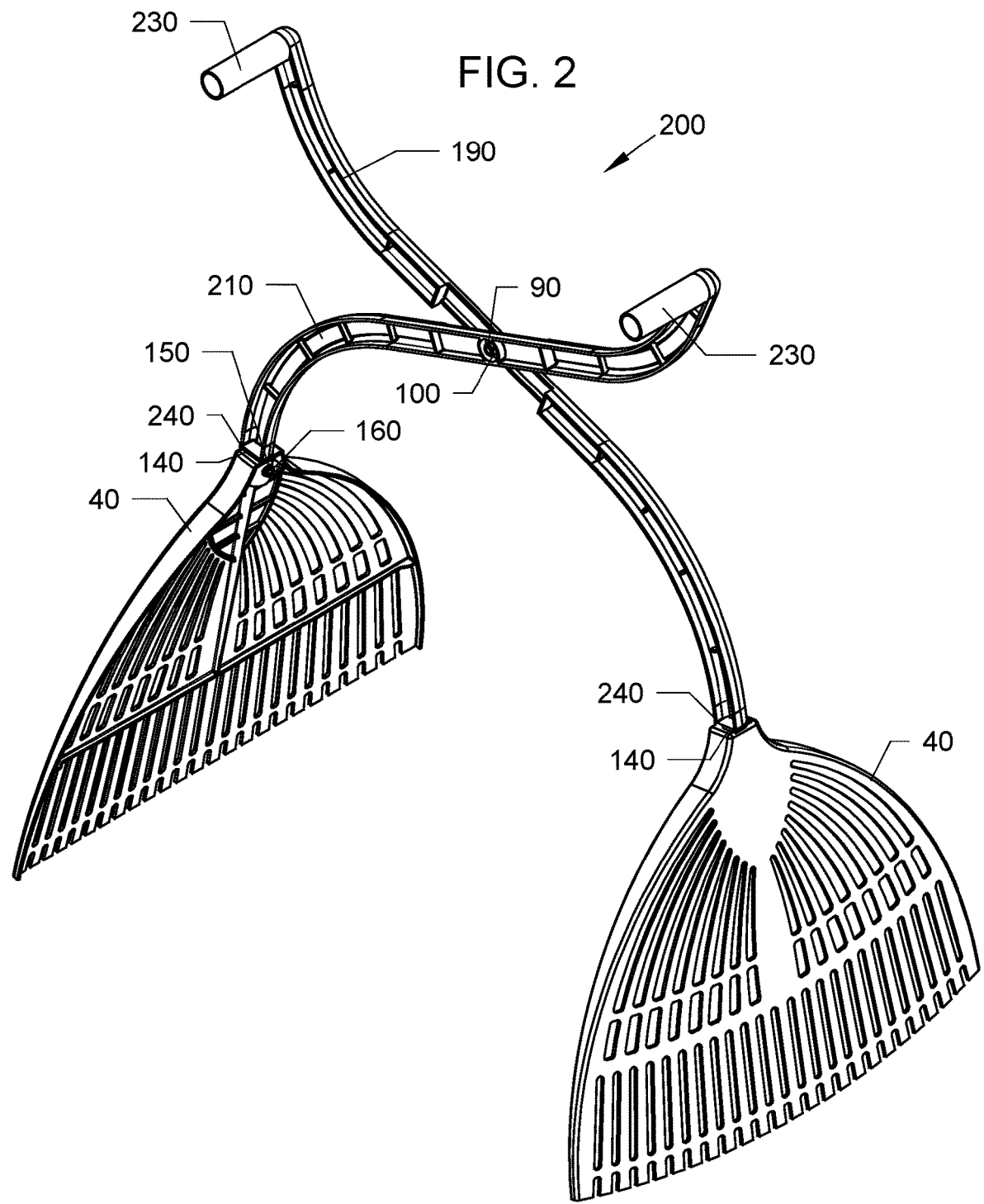

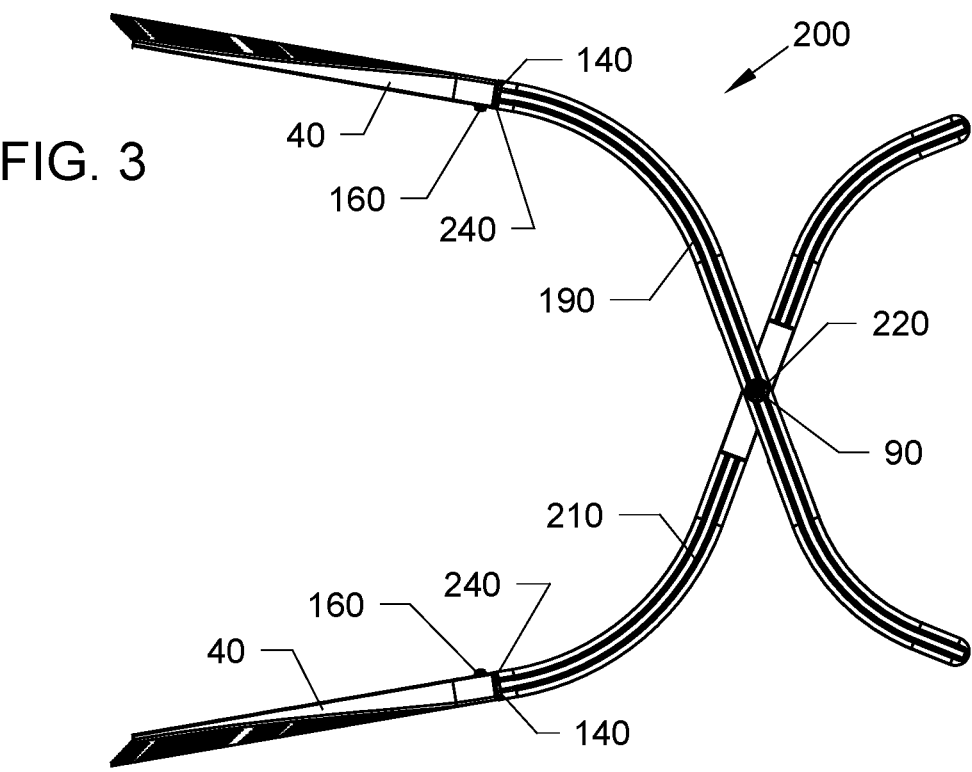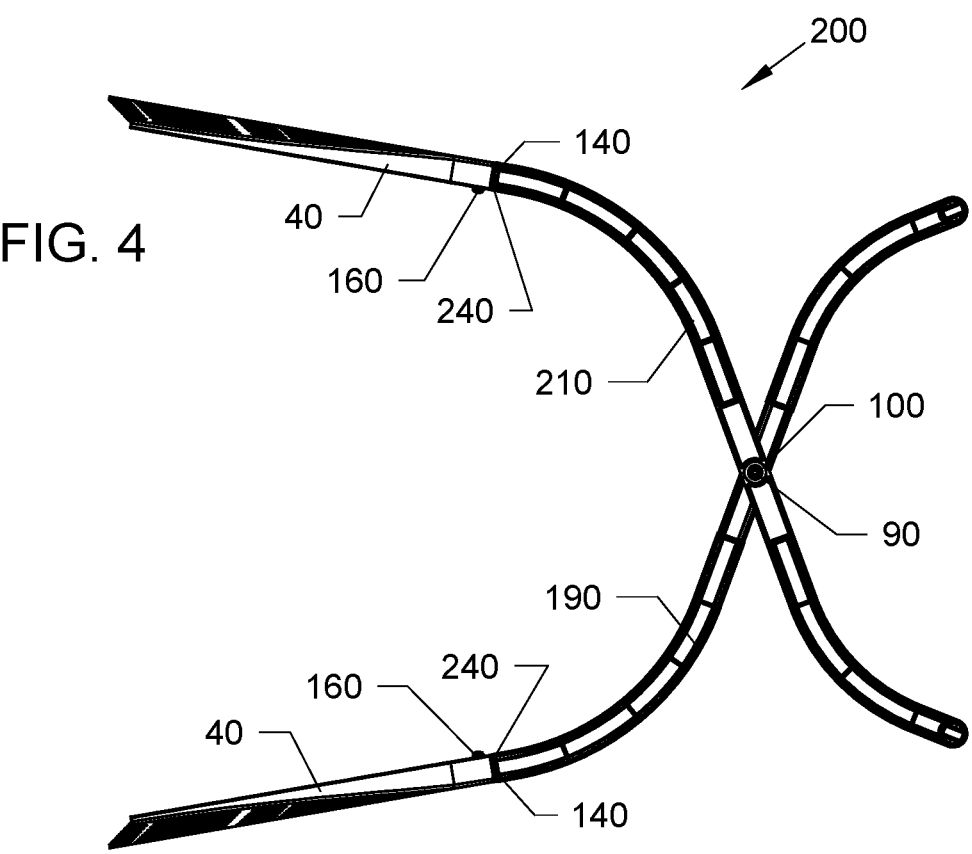

LEAF LIFTER DEVICE

CROSS REFERENCE TO RELATED APPLICATION

This application claims the benefit of priority to U.S. Provisional Application Ser. No. 62/919,777 filed Mar. 28, 2019, the entire disclosure of which is incorporated herein by specific reference thereto.

FIELD OF INVENTION

This invention relates to garden tools, and in particular to devices, systems and methods for simplifying the collection, pickup and transportation of fallen leaves and other lawn debris, providing a pair of pivotable molded plastic elongated arms with handle ends and opposite rake ends, so a user can manipulate the handle ends as tongs to pick up yard waste, such as but not limited to leaves, branches and the like, to be moved into yard waste containers, such as trashcans, leaf bag and the like, with little to no bending over where the pivot point of the pivoting arms is substantially closer to the handle ends than to the rake end.

BACKGROUND AND PRIOR ART

Raking leaves and other lawn debris, especially in the autumn and fall, can be a continuous frustrating chore. Generally, the marketplace limits the available tools to conventional rakes and tractor driven vacuums and the like.

Attempts have been made over the years to develop and use pivoting rakes. See for example, U.S. Pat. No. 2,751,245 to Boyd; U.S. Pat. No. 3,688,484 to Cox; U.S. Pat. No. 5,564,266 to Laughlin; U.S. Pat. No. 7,168,230 to Waddell; U.S. Pat. No. D506,112 to Roberson; and U.S. Pat. No. D701,097 to Petruzzelli et al.

However, many of these pivoting rakes are limited to taking traditional straight elongated handles with traditional rake heads and merely using a simple pivoting mechanism in a middle or lower portion of the handle to allow the single straight elongated handles to pivot with one another. Clearly, trying to hold two straight handled traditional rakes is very difficult to be used.

Additionally, the pivot point is generally located at a midpoint of the rake handles or at a lower portion of the rake handles, which also creates difficulty in lifting leaves and other lawn debris so as you open this devise your handles need to move the same.

Thus, the need exists for solutions to the above problems with the prior art.

SUMMARY OF THE INVENTION

A primary objective of the present invention is to provide devices, systems and methods for providing workable pivoting plastic molded handle rake-like scoop for simplifying the collection, pickup and transportation of fallen leaves and other lawn debris.

A secondary objective of the present invention is to provide devices, systems and methods for providing a pair of pivotable plastic molded arms with handle ends and opposite rake ends by placing the pivotal axis point higher than the midpoint of the tool, for maximizing the amount of leaves and debris that can be picked up at once and minimizing the work with little to no bending over.

A third objective of the present invention is to provide devices, systems and methods for providing a pair of pivotable molded plastic arms with handle ends and opposite rake ends, so that a user can manipulate the handle ends as tongs to pick up yard waste, such as but not limited to leaves, branches and the like, to be moved into yard waste containers, such as trashcans, lawn bags, and the like, where the pivot point of the pivoting arms is substantially closer to the handle ends than to the rake end.

A fourth objective of the present invention is to provide devices, systems and methods for providing a pair of pivotable molded plastic elongated arms with handle ends and opposite rake ends that is able to pick up substantial amounts of leaves/debris with little or no bending over by the user.

A preferred embodiment of the leaf lifter device uses a pivotal point approximately 40% or less closer to the handle ends which enables more work to be accomplished with less effort.

A pivotal point at a distance of approximately ⅓ from the top of the unit enables the rake like scoopers to expand approximately 3× greater than the handle differentiation, maximizing the amount of leaves/debris being picked up.

By placing the pivotal axis point higher than the midpoint of the tool, the lower portion of the arms can spread up to 3 times greater than the upper arms, and the handles conveniently point the ends of the collectors (as rake scoopers) toward one another maximizing the amount of leaves and debris that can be picked up at once and minimizing the work.

Closing the upper arms sections also closes the lower arm sections and gathers leaves and debris from the lawn into a clump. Thereafter, the clump of leaves can be conveniently lifted and transported as desired.

An embodiment of the pivoting garden tool having plastic pivoting arms, can include a first elongated molded plastic arm having a first upper curved portion with a first elongated handle end, a first middle portion, and a first lower curved portion with a first lower end, and a first pivot point in the first middle portion being closer to the first elongated handle end than to the first lower end, a first rake head attached to the first lower end, a second elongated molded plastic arm having a second upper curved portion with a second elongated handle end, a second middle portion, and a second lower curved portion with a second lower end, and a second pivot point in the second middle portion being closer to the second elongated handle end than to the second lower end, a second rake head attached to the first lower end, and a pivot mechanism for pivotally attaching the first pivot point of the first elongated molded plastic arm to the second pivot point of the second elongated molded plastic arm, wherein manipulating the first elongated handle end and the second elongated handle end allows for the garden tool to pick up yard waste with the first rake head and the second rake head.

The first pivoting point can be spaced approximately twice as close to the first elongated handle end as to the first rake end, and the second pivoting point and can be approximately twice as close to the second elongated handle end as to the second rake end.

The first elongated handle end can be substantially perpendicular to and extends away from the first middle portion, the second elongated handle end can be substantially perpendicular to and extends away from the second middle portion, and wherein the first elongated handle end and the second elongated handle end can extend in identical directions and are both parallel to one another.

The first lower curved portion can form between approximately 60 degree to approximately 80 degree angle between the first lower end and the first middle portion, and the second lower curved portion can form between approximately 60 degree to approximately 80 degree angle between the second lower end and the second middle portion.

The first lower curved portion can form an approximately 45 degree to approximately 75 degree angle between the first lower end and the first middle portion, and the second lower curved portion can form an approximately 45 degree to approximately 75 degree angle between the second lower end and the second middle portion.

The first upper curved portion and the first lower curved portion can be in an S shape and in a same plane, wherein the second upper curved portion and the second lower curved portion are in an S shape and in a same plane.

The first middle portion can include a generally straight middle portion and the second middle portion includes a generally straight middle portion, wherein the first pivot point can be located in the first generally straight middle portion, and the second pivot point can be located in the second generally straight middle portion, so that the first generally straight middle portion and the second generally straight middle portion can remain substantially parallel identical planes to one another while the first elongated molded plastic arm is pivotally attached to the second elongated molded plastic arm.

The first rake head can include a first top end which slides about the first lower end of the first elongated molded plastic arm, the first top end fanning outward to concave curved sides to a first enlarged bottom end having a plurality of spaced apart narrow diameter and short extending first tines, the first rake head can form a first scoop, wherein the second rake head can include a second top end which slides about the second lower end of the second elongated molded plastic arm, the second top end fanning outward to concave curved sides to a second enlarged bottom end having a plurality of spaced apart narrow diameter and short extending second tines, the second rake can form a first scoop.

The first enlarged bottom end of the first rake head can have a first outer convex curved edge, and the second enlarged bottom end of the second rake head can have a second outer convex curved edge, wherein each of the first tines and each of the second tines can each no longer than approximately ¾ inch in length.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 2 is a rear perspective view of the leaf pick up device of FIG. 1.

FIG. 3 is a front view of the leaf pick up device of FIG. 1.

FIG. 4 is a rear view of the leaf pick up device of FIG. 1.

DESCRIPTION OF THE PREFERRED EMBODIMENTS

Figure 1:
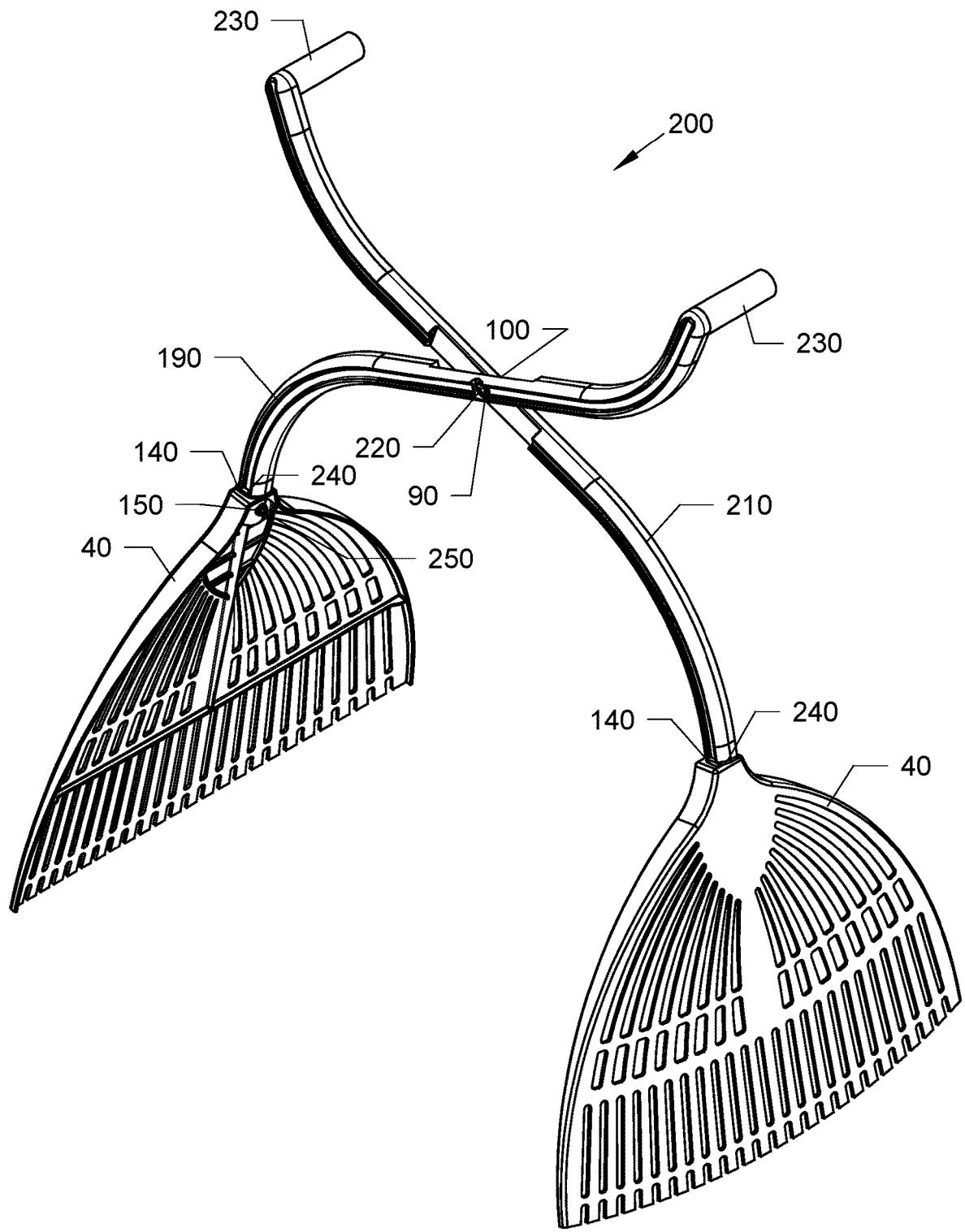
FIG. 1 is a front perspective view of the leaf pickup device with molded plastic elongated arms and handles in an open position.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

A list of components will now be described.
40 Rake head.
50 Slide-on handle grips.
60 Device user.
70 Leaves or refuse being picked up.
80 Tubular handle axle screw.
90 Plastic washer(s).
100 Locking nut(s).
140 Cavity in rake head accepts mount section of handle (tubular or molded) for mounting of rake of rake head to handles.
150 Hole in rake head for rake head mounting screw.
170 Scissoring handle motion initiated by user.
180 Scissoring rake head motion resulting from user motion.
190 Front elongated arm/handle (molded version)
200 Leaf Pick-Up Device with injection molded handles.
210 Rear elongated arm/handle (molded version).
215 Holes (openings) in middle of the S shaped arms 190, 200
220 Molded handle axle screw.
230 Grip section of molded handle.
240 Rake head mount section of molded handle.
245 Hole in molded handle for rake head mounting screw.
250 Rake head mounting screw for molded handles.

Figure 5:
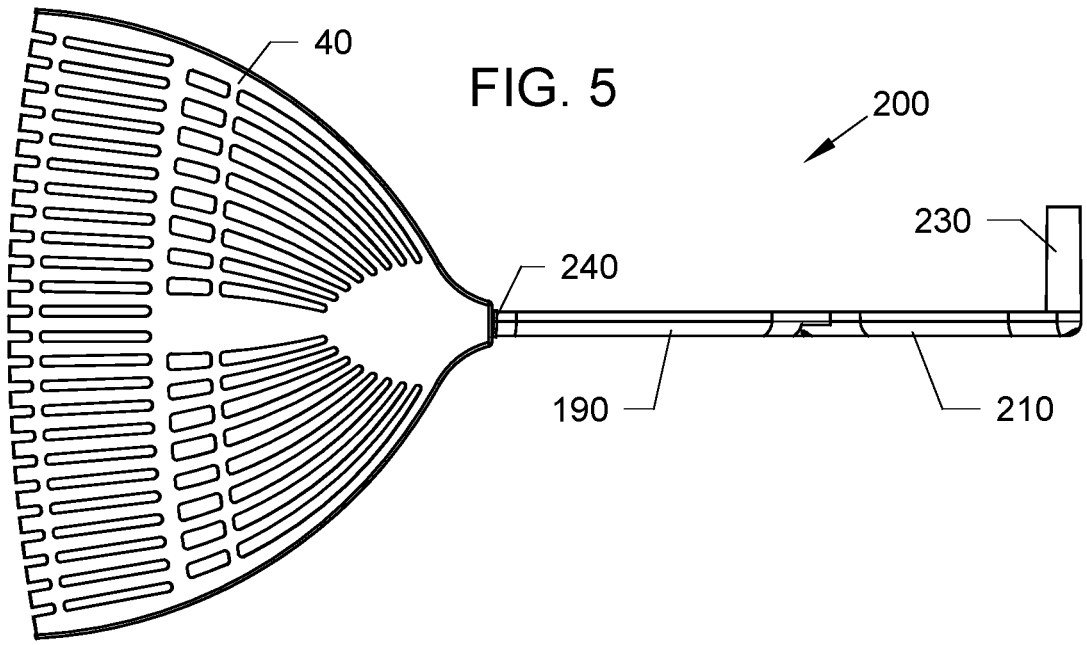
FIG. 5 is a left side view of the leaf pick up device of FIG. 1.
Figure 6:
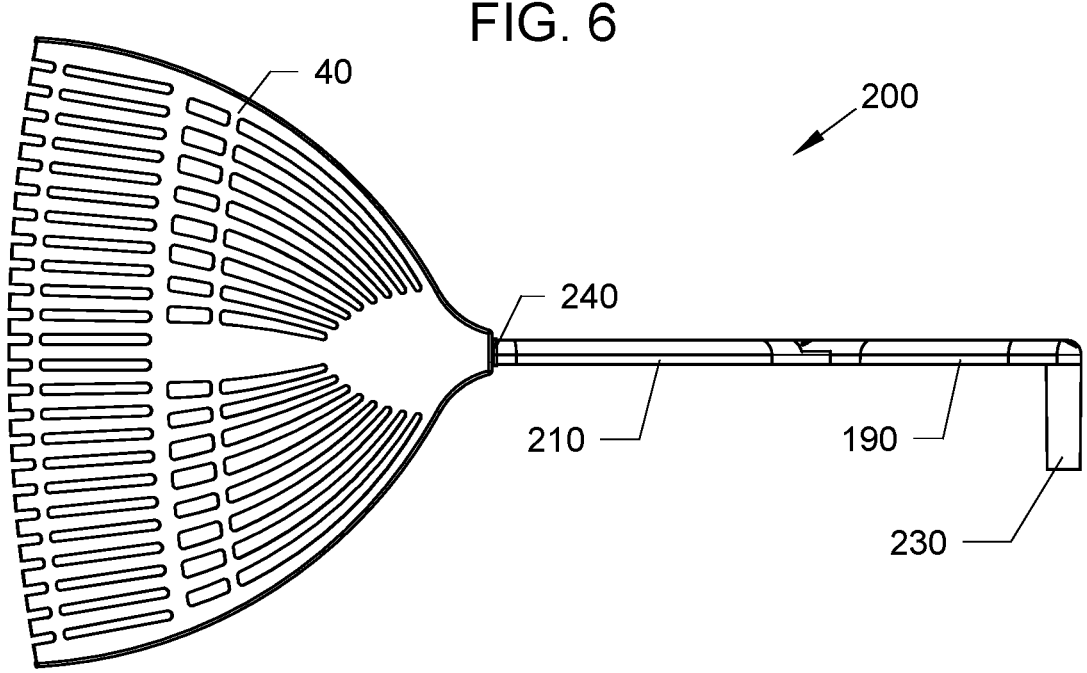
FIG. 6 is a right side view of the leaf pick up device of FIG. 1.
Figure 7:
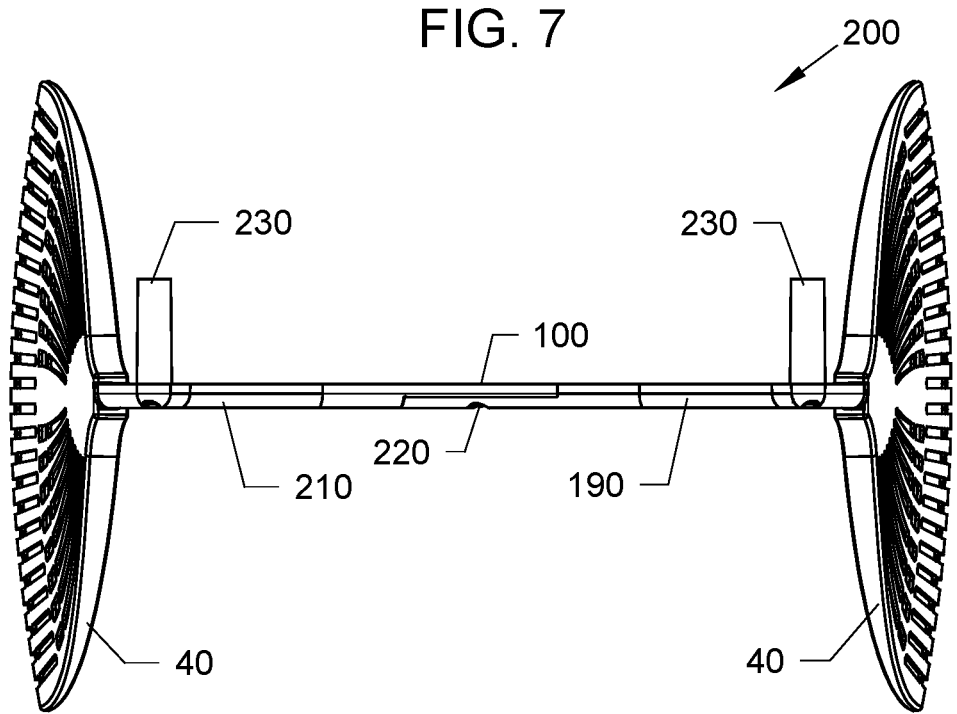
FIG. 7 is a top view of the leaf pick up device of FIG. 1.
Figure 8:
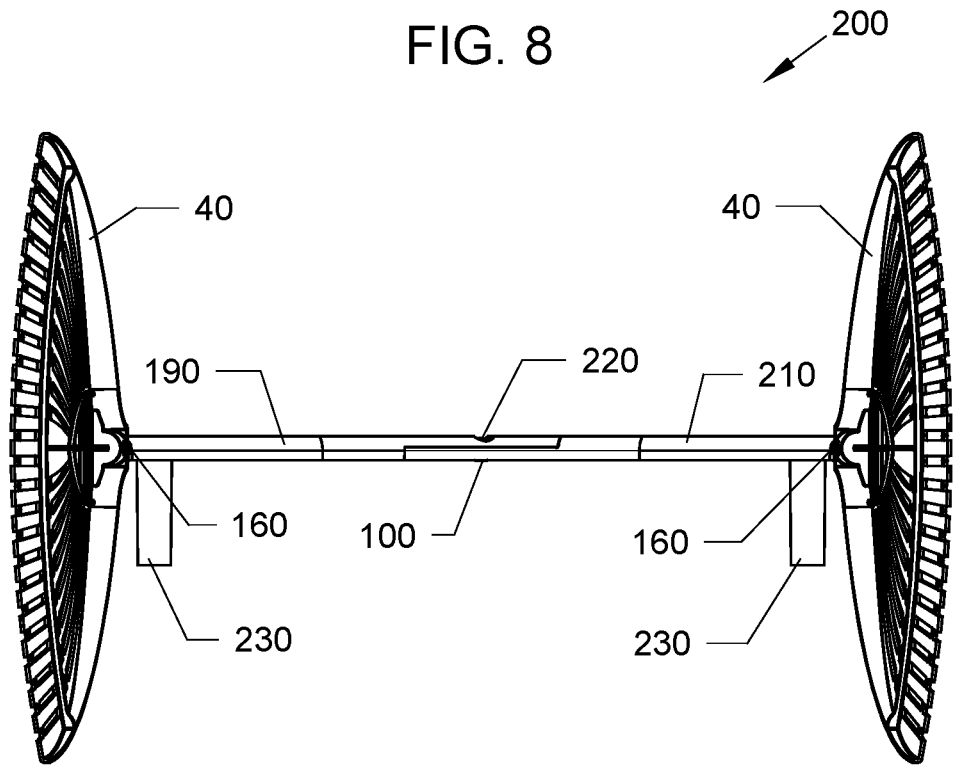
FIG. 8 is a bottom view of the leaf pick up device of FIG. 1.

FIG. 1 is a front perspective view of the leaf pickup device 200 with molded plastic elongated arms 190, 210 and handles in an open position. FIG. 2 is a rear perspective view of the leaf pick up device 200 of FIG. 1. FIG. 3 is a front view of the leaf pick up device 200 of FIG. 1. FIG. 4 is a rear view of the leaf pick up device 200 of FIG. 1. FIG. 5 is a left side view of the leaf pick up device 200 of FIG. 1. FIG. 6 is a right side view of the leaf pick up device 200 of FIG. 1. FIG. 7 is a top view of the leaf pick up device 200 of FIG. 1. FIG. 8 is a bottom view of the leaf pick up device 200 of FIG. 1.

Referring to FIGS. 1-8, the leaf pick up device 200 can include two single elongated molded plastic arms/handles 190, 210 that can each be molded into S shapes as shown in 190, 210 of the FIGURES. Molding can be done by injection molding, and the like.

The arms 190, 210 can have an outer diameter of between approximately ¾ of an inch and approximately ¼ inches.

The overall length of the device 10 from the handle ends 120 to the bottom of the rake head 40 can be approximately 37 inches when the device is closed, and is approximately 28 inches in height when the device is open. The device 10 can have an overall weight of between approximately 1 to approximately 3 pounds.

Each of the elongated molded plastic arms 190, 210 can have rearwardly extending handle ends 230 having longitudinal axes that are approximately perpendicular to the molded plastic arms 190, 210. The handle ends 230 that can include slide on non-metal handle grips that can be formed from elastomeric materials, rubber and the like. Both of the handle ends 230 are oriented to be in parallel to each other, as well as be oriented perpendicular to the elongated arms 190, 210. The handle ends 230 are intended to both be directed back toward the user of the leaf pick up device 200.

The generally straight middle portions of each of the molded plastic arms 190, 210 can be pivotally attached to one another by components, such as but not limited to a molded handle axle screw 220, plastic washer 90 and locking nut 100.

The lower portions of each of the elongated molded plastic arms 190, 210 can include inwardly curving portions with lower ends 240 that can fit into upper cavity ends 140 of the rake heads (rakes) 40. The rake heads 40 can include an opening(s) (hole(s)) 150 that allow for a fastener such as a mounting screw 250 to be inserted and passed through into another opening(s) (hole(s)) 245 in the lower end of the elongated molded plastic arms 190, 210.

Figure 9:
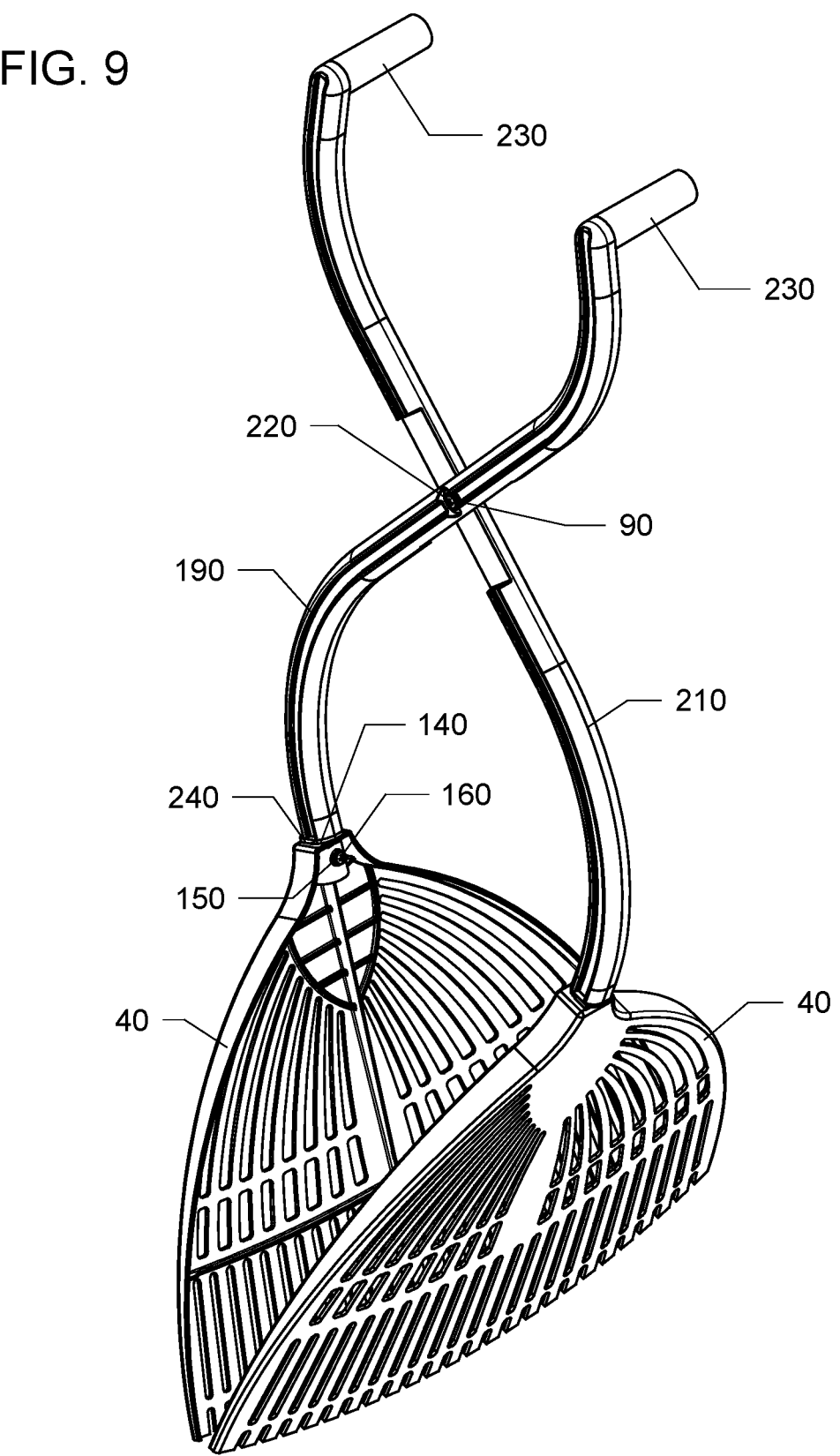
FIG. 9 is a front right perspective view of the leaf pick up device of FIG. 1 with the arms and handles in a closed position.
Figure 10:
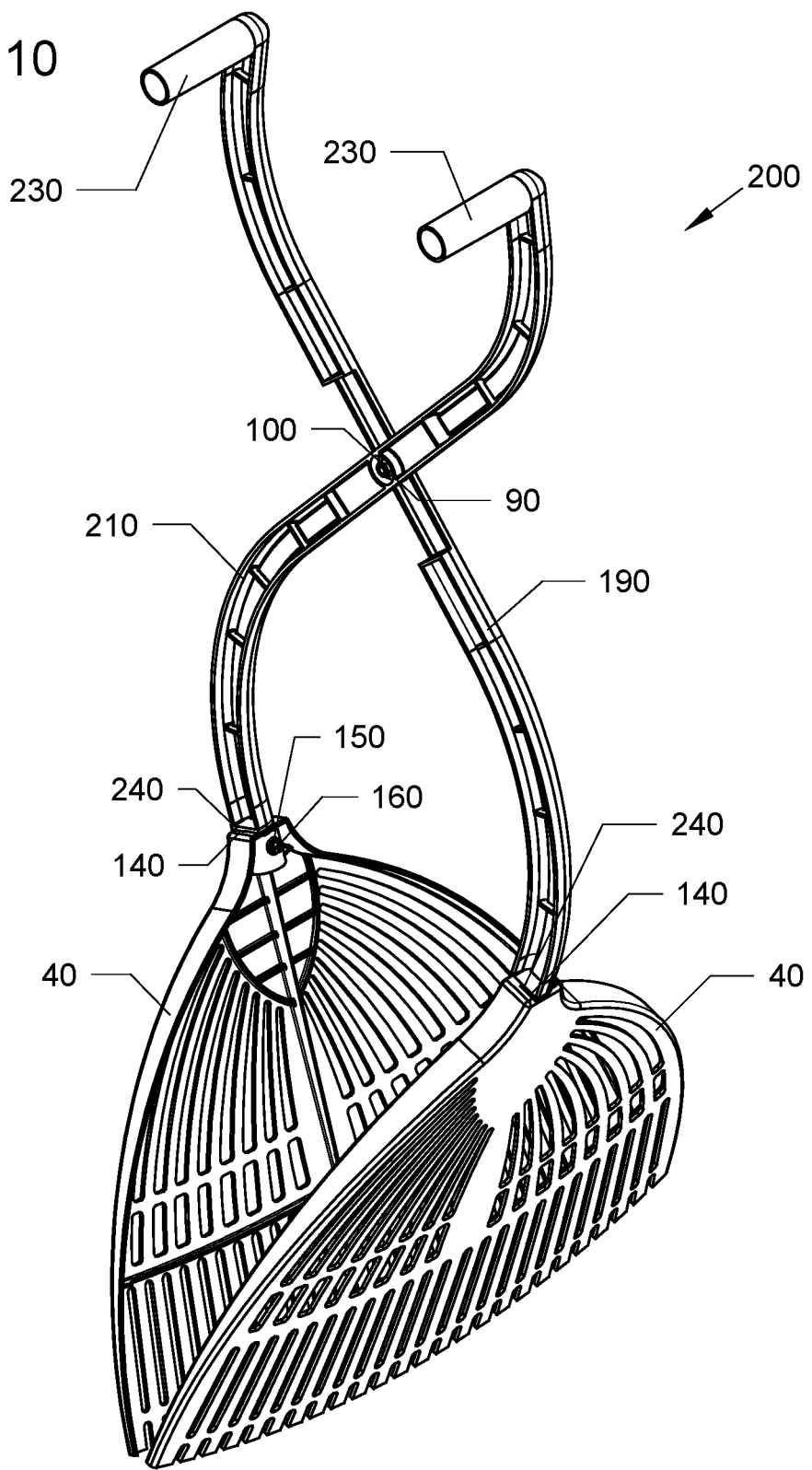
FIG. 10 is a rear view of the leaf pickup device of FIG. 9.
Figure 11:
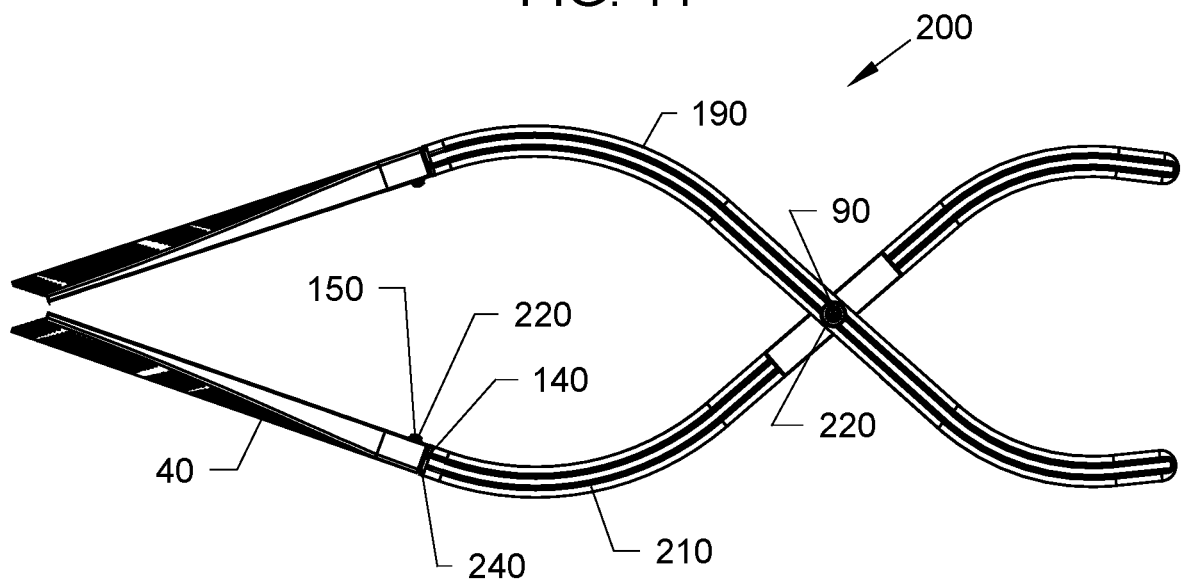
FIG. 11 is a front view of the leaf pickup device of FIG. 9.
Figure 12:
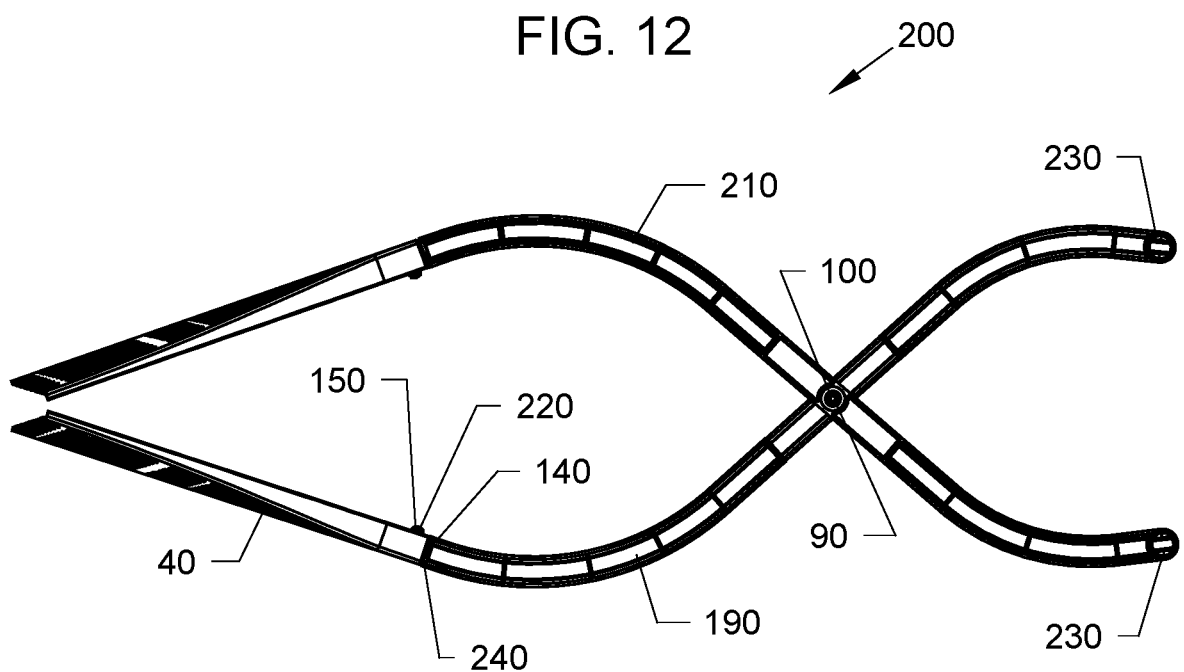
FIG. 12 is a rear view of the leaf pickup device of FIG. 9.
Figure 13:
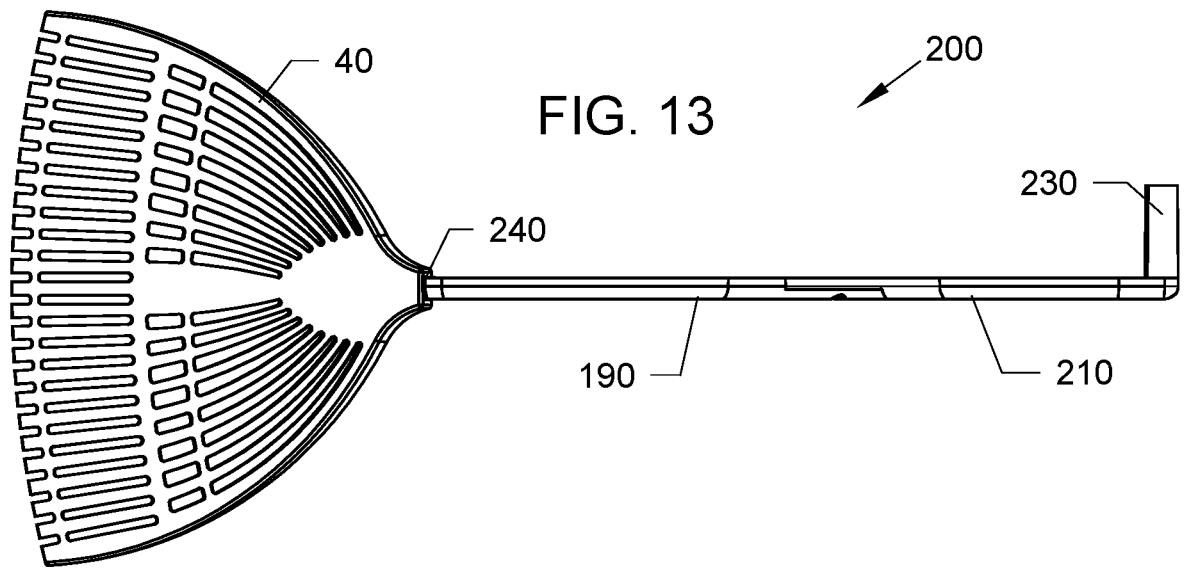
FIG. 13 is a left side view of the leaf pickup device of FIG. 9.
Figure 14:
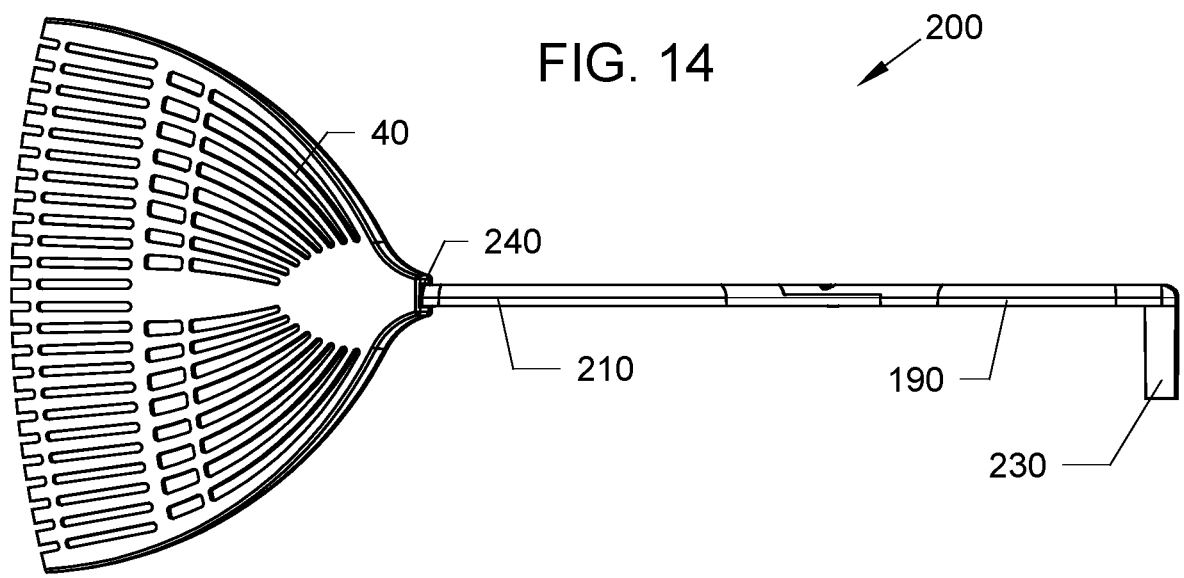
FIG. 14 is a right side view of the leaf pickup device of FIG. 9.
Figure 15:
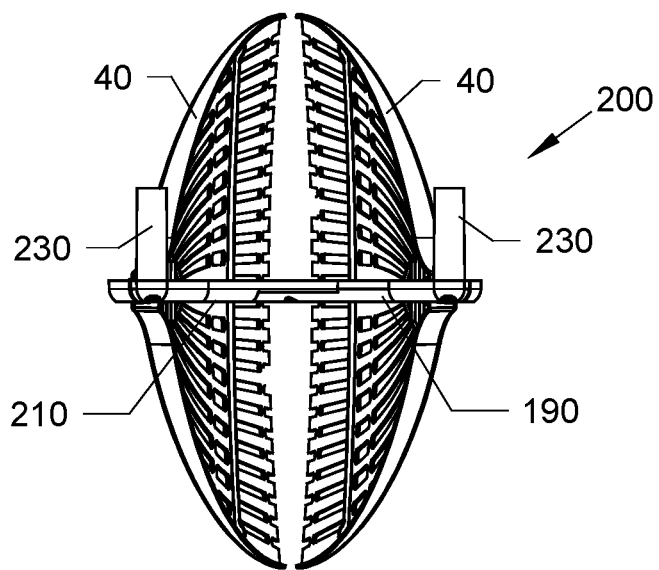
FIG. 15 is a top view of the leaf pickup device of FIG. 9.
Figure 16:
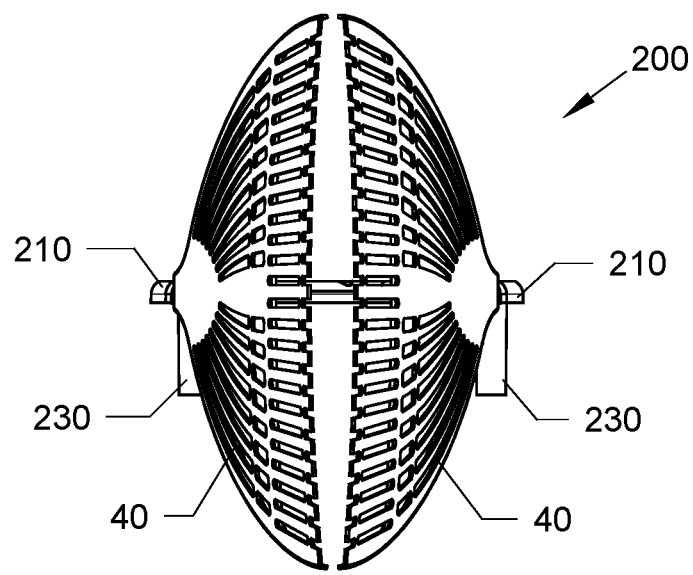
FIG. 16 is a bottom view of the leaf pickup device of FIG. 9.

FIG. 9 is a front right perspective view of the leaf pick up device 200 of FIG. 1 with the elongated molded plastic arms 190, 210 and handles in a closed position. FIG. 10 is a rear view of the leaf pickup device 200 of FIG. 9. FIG. 11 is a front view of the leaf pickup device 200 of FIG. 9. FIG. 12 is a rear view of the leaf pickup device 200 of FIG. 9. FIG. 13 is a left side view of the leaf pickup device 200 of FIG. 9. FIG. 14 is a right side view of the leaf pickup device 200 of FIG. 9. FIG. 15 is a top view of the leaf pickup device 200 of FIG. 9. FIG. 16 is a bottom view of the leaf pickup device 200 of FIG. 9.

Figure 17A:
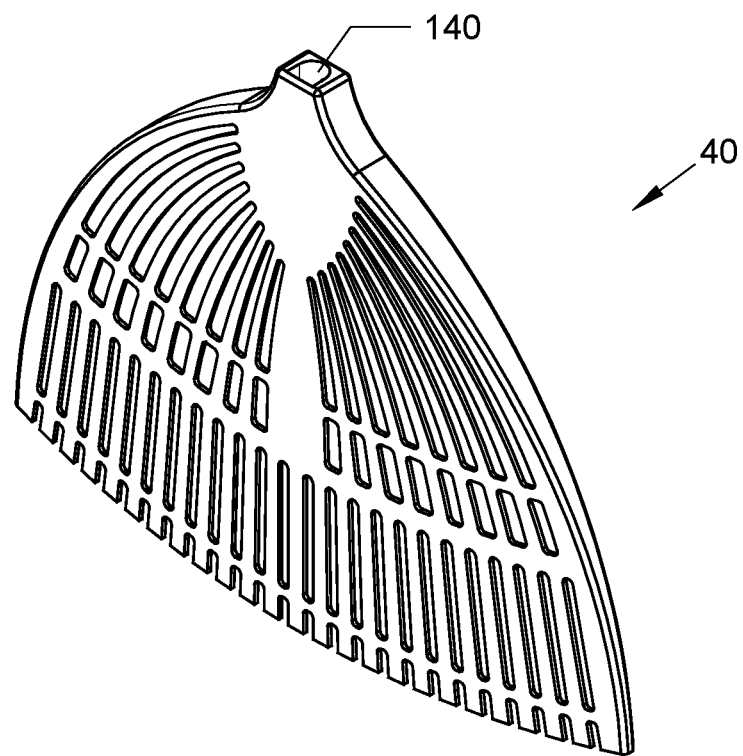
FIG. 17A is a front perspective view of the rake head detached from the leaf pickup device of the preceding figures.
Figure 17B:
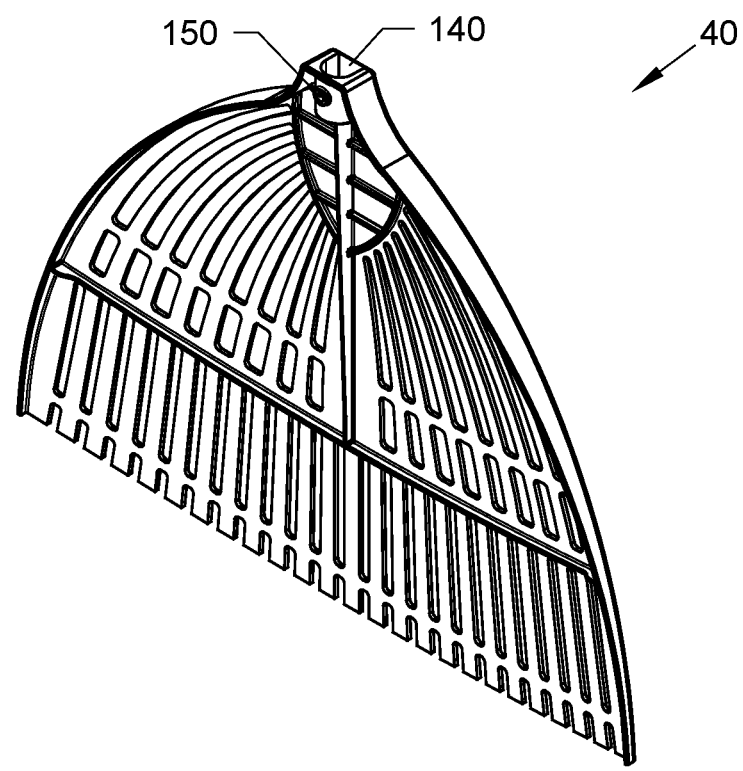
FIG. 17B is a rear perspective view of the rake head of FIG. 17A.
Figure 17C:
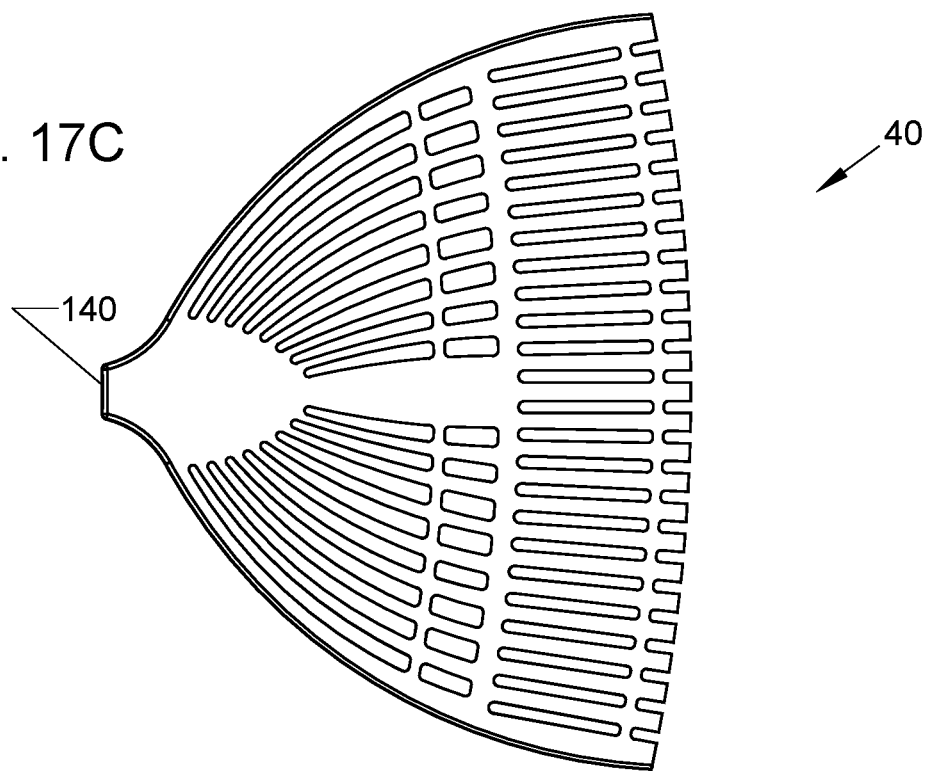
FIG. 17C is a front view of the rake head of FIG. 17A.
Figure 17D:
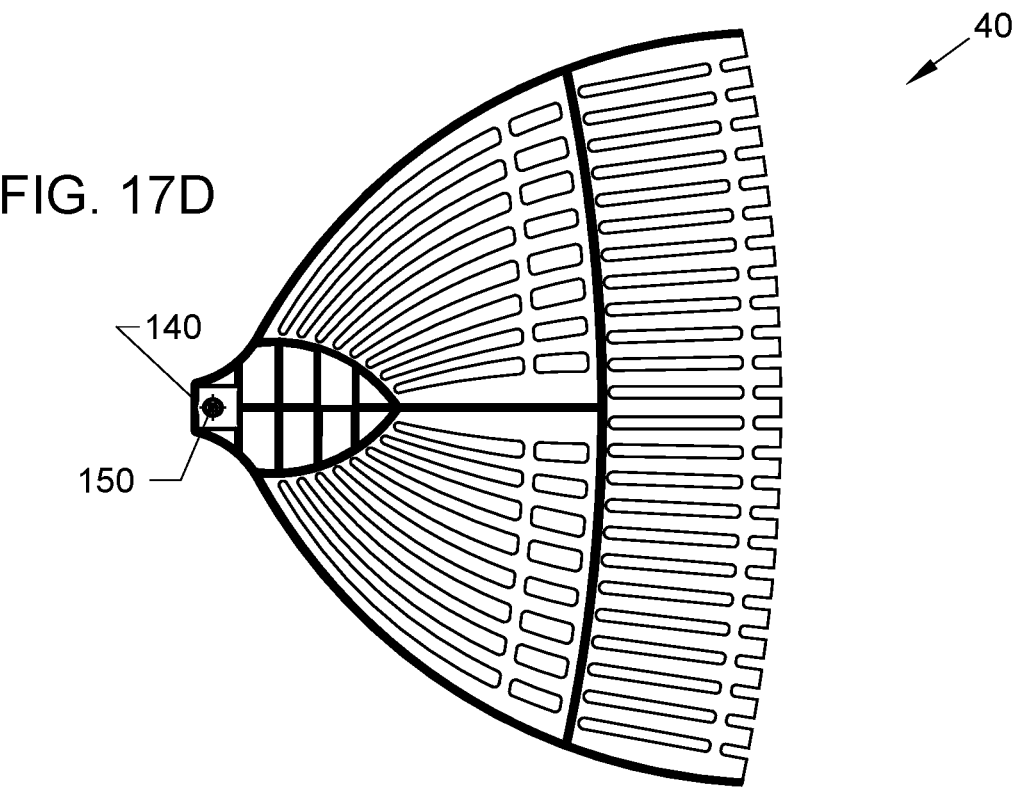
FIG. 17D is a rear view of the rake head of FIG. 17A.
Figure 18A:
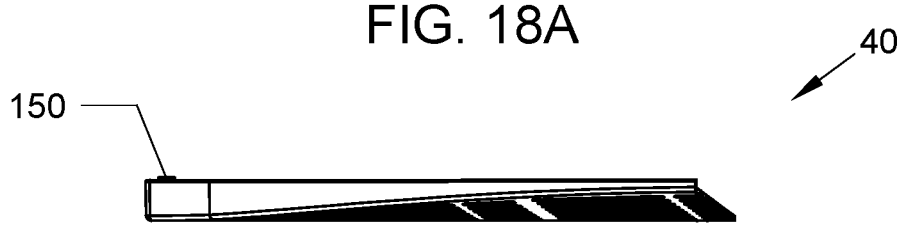
FIG. 18A is a right side view of the rake head of FIG. 17A.
Figure 18B:
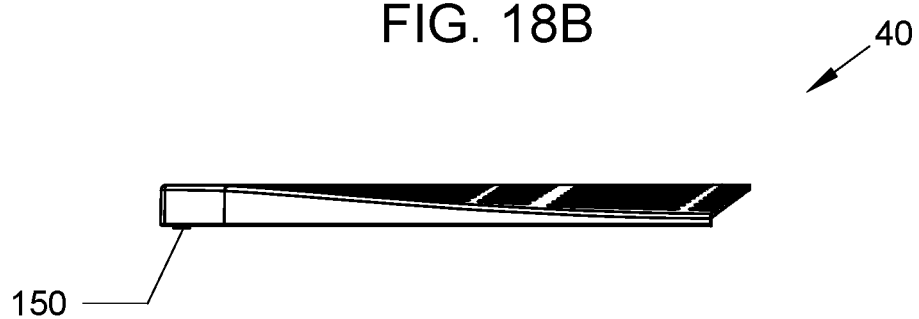
FIG. 18B is a left side view of the rake head of FIG. 17A.
Figure 18C:
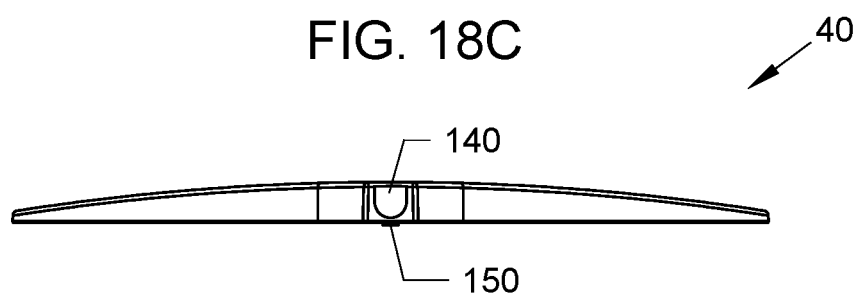
FIG. 18C is a top view of the rake head of FIG. 17A.
Figure 18D:
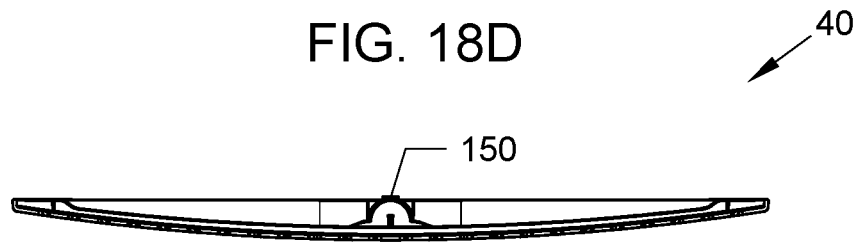
FIG. 18D is a bottom view of the rake head of FIG. 17A.

FIG. 17A is a front perspective view of the rake head 40 detached from the leaf pickup device 10 of the preceding FIGURES. FIG. 17B is a rear perspective view of the rake head 40 of FIG. 17A. FIG. 17C is a front view of the rake head 40 of FIG. 17A. FIG. 17D is a rear view of the rake head 40 of FIG. 17A. FIG. 18A is a right side view of the rake head 40 of FIG. 17A. FIG. 18B is a left side view of the rake head 40 of FIG. 17A. FIG. 18C is a top view of the rake head 40 of FIG. 17A. FIG. 18D is a bottom view of the rake head 40 of FIG. 17A.

Referring to FIGS. 17A-17D and 18A-18D, the rake heads 40 are not traditional rakes with traditional long bendable tines. Here the tines are no longer than approximately ¾ inch in length and can be arrow shaped, stub shaped, tab shaped, and the like. Additionally, the lower outer edge perimeter of these non-traditional tines can form a generally convex shape. The rakes heads 40 are used more like scoops to lift leaves/debris which can not be accomplished with traditional rakes.

Figure 19:
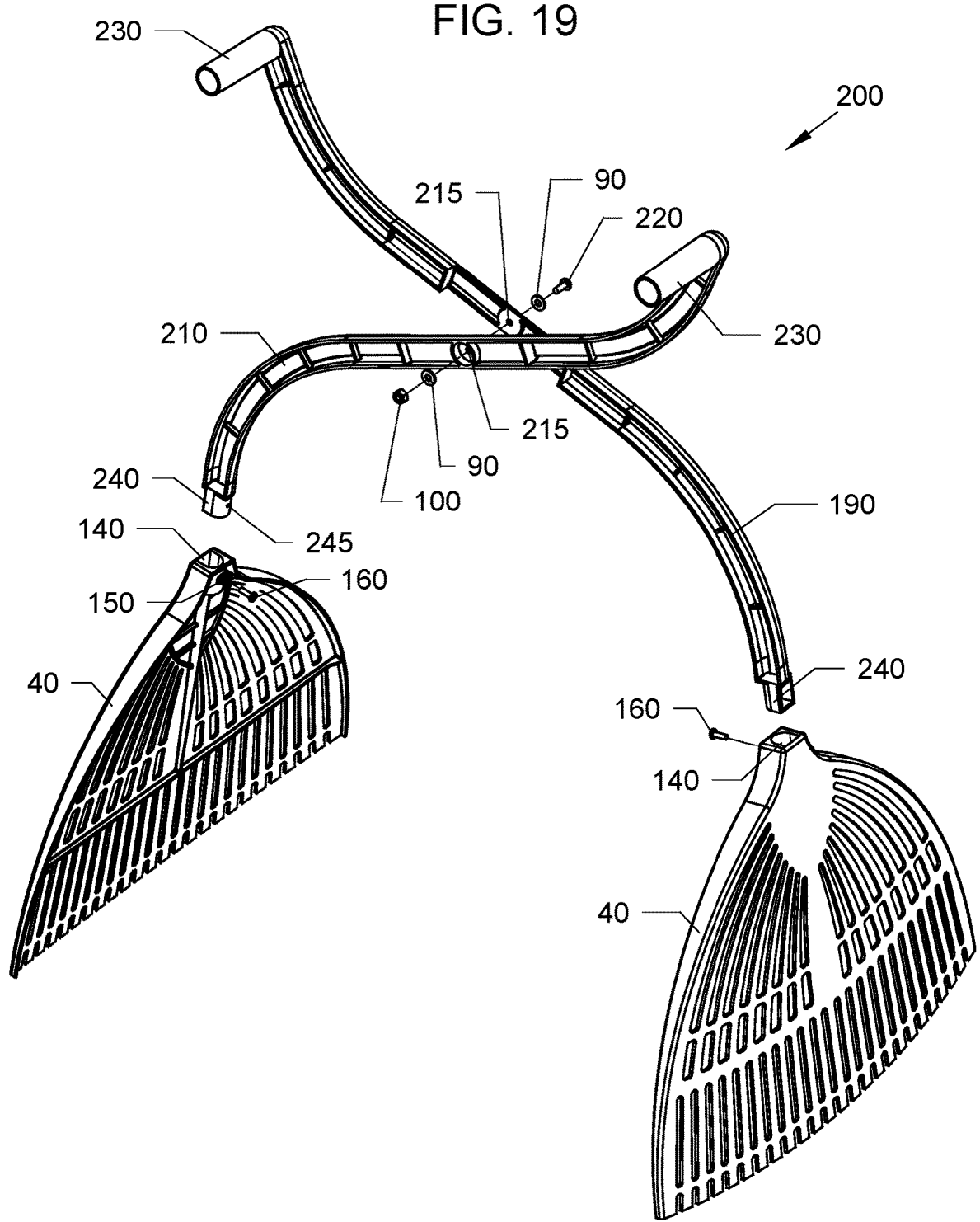
FIG. 19 is an exploded view of the rake head device of FIGS. 1-16.

FIG. 19 is an exploded view of the rake head device 200 of FIGS. 1-16, which shows the two elongated molded plastic generally S shaped arms 190, 210 with generally perpendicular bent upper grip handle ends 230 and lower inward curved ends 240 having opening(s) (hole(s)) 245 for allowing a fastener 160, such as a screw or like, to pass into, in order to attached rake heads 40 thereon.

As shown in FIG. 19, generally straight middle portions of the elongated molded plastic S shaped arms 190, 210 can be pivotally attached to one another by fasteners, such as but not limited to an axle screw 220, that can pass through hole(s) (opening(s)) 215 and held in place by additional washer(s) 90 and a locking nut 100.

Again, the rake heads 40 can be attached by inserting the lower ends 240 of the molded plastic arms 190, 210 into a cavity 140 and held in place by a fastener(s) 160 that passes through opening(s) (hole(s)) 140 in both the rake head 40 and into the opening(s) (hole(s)) 245 in the lower ends 240 of the elongated tubular arms 20, 30.

Figure 20:
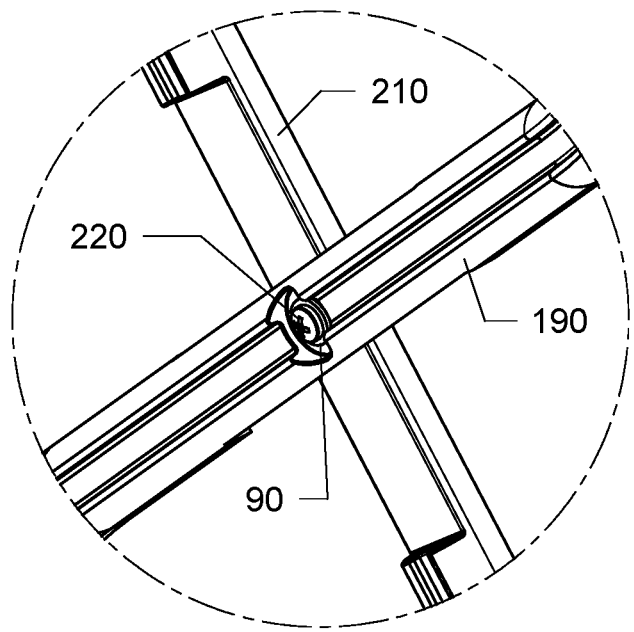
FIG. 20 is an enlarged front perspective view of the pivot components of the elongated arms of the leaf picking device of FIGS. 1-16.
Figure 21B:
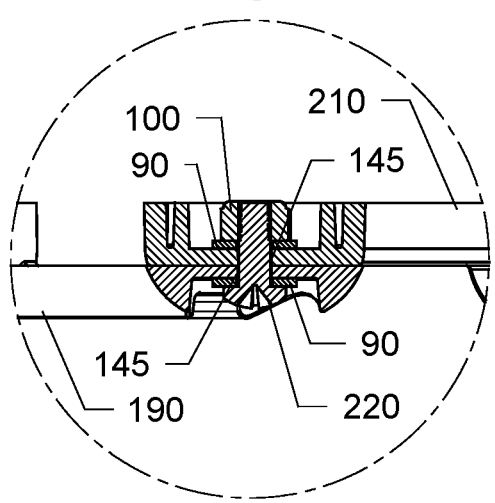
FIG. 21B is a cross-sectional view of the pivot components of FIG. 21A along arrows 21B.
Figure 21A:
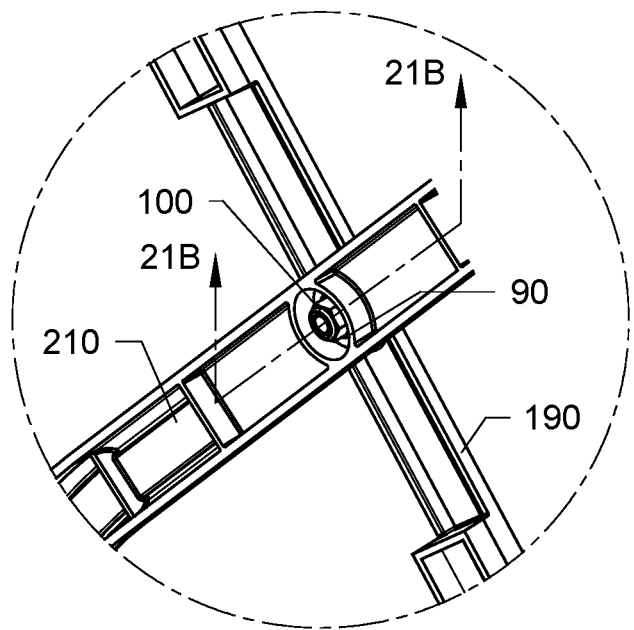
FIG. 21A is a rear perspective view of the pivot components of FIG. 20.

FIG. 20 is an enlarged front perspective view of the pivot components 220, 145, 100 of the elongated arms 190, 210 of the leaf picking device 200 of FIGS. 1-16. FIG. 21A is a rear perspective view of the pivot components of FIG. 20. FIG. 21B is a cross-sectional view of the pivot components of FIG. 21A along arrows 21B.

Figure 22:
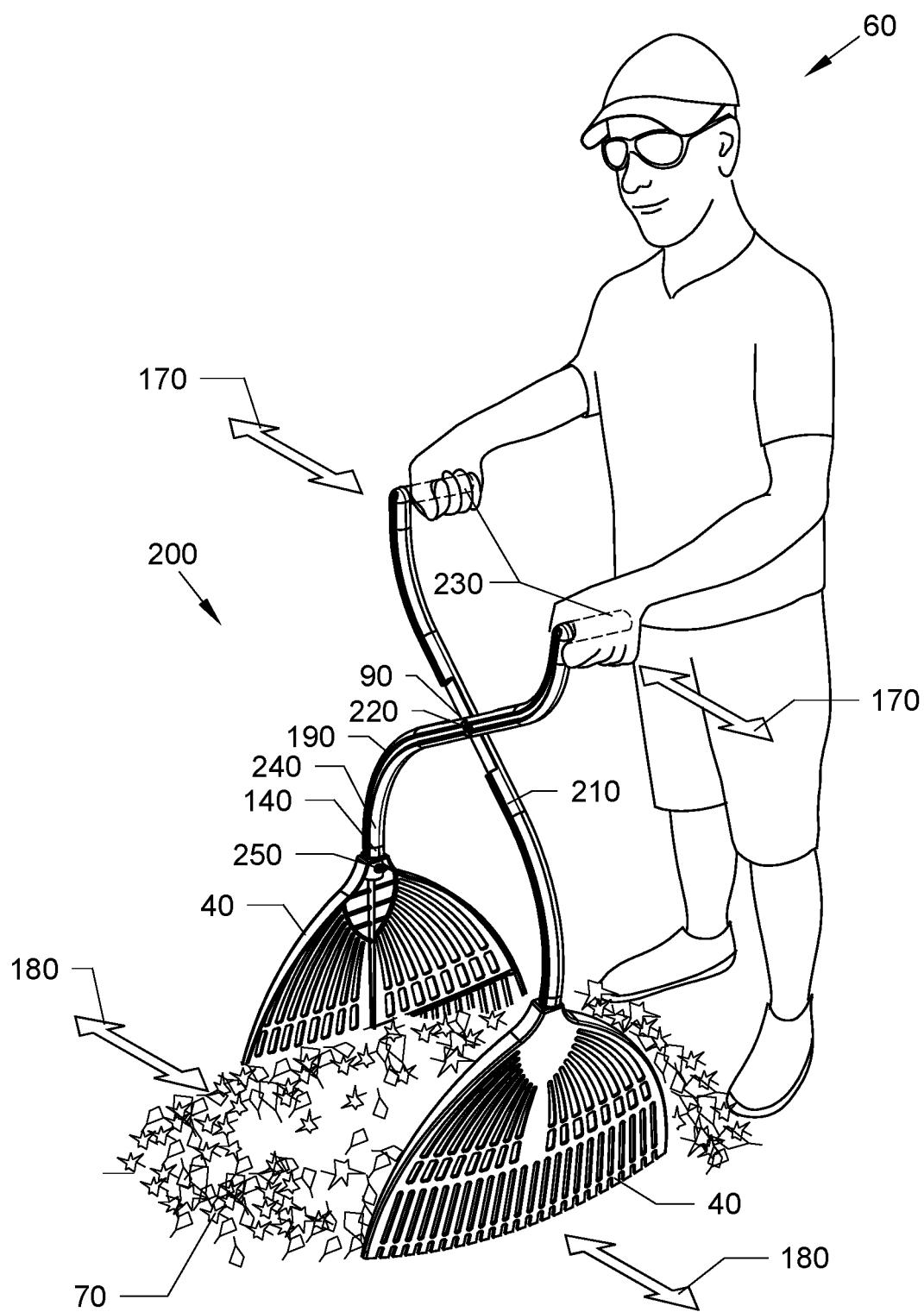
FIG. 22 is a perspective view of someone using the pick-up device. In this view, the device is open and positioned with the rake heads on either side of a pile of leaves of refuse on the ground. The user, by working the handles in a scissoring motion, can cause the rake heads to grasp the leaves and pick them up for deposit in a waste container or bag.

FIG. 22 is a perspective view of someone 60 using the pick-up device 200. In this view, the device 200 is open and positioned with the rake heads 40 on either side of a pile of leaves/refuse 70 on the ground. The user 60, by working the handles 230 in a scissoring motion 170, can cause the rake heads 40 to move in a scissoring direction 180 to grasp the leaves/refuse 70 and pick them up for deposit in a waste container or bag.

Figure 23:
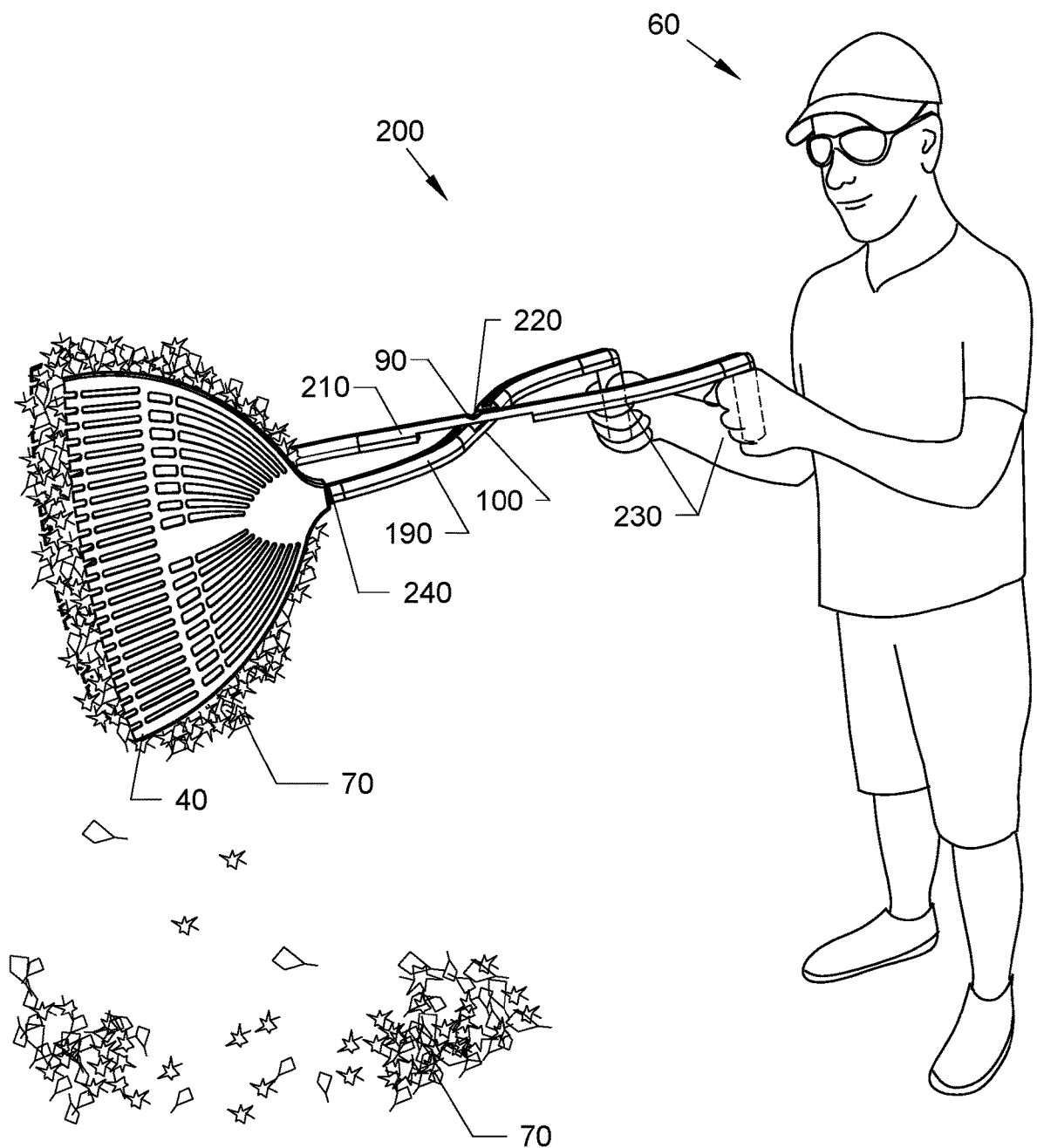
FIG. 23 is another perspective view of FIG. 22 showing the rake heads grasping the leaves and lifting them for deposit into a waste container or bag.

FIG. 23 is another perspective view of FIG. 23 showing the rake heads 40 grasping the leaves/refuse 70 and lifting the clumped leaves/refuse 70 for deposit into a waste container or bag.

While the rake head(s) 40 are described as different from traditional rakes, the rake heads 40 are not limited to those depicted in the figures. The rake head(s) can be used as a rake-like scooper of varying shapes and sizes in order to maximize collection of leaves/debris when being used.

While an example of a pivoting components, such as axles screws, washers and a locking nut are shown, other types of pivoting mechanisms can be used. For example, snappable components such as an enlarged mushroom headed axle can be inserted into openings in the middle of both S shaped elongated molded plastic arms 190, 210 in order to allow the arms 190, 210 to be pivotally attached to one another or as simple as a single self tapping screw.

The term "approximately"/"approximate" can be +/−10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A pivoting garden tool, consisting of:

a first single elongated molded plastic arm molded into a first S shape, the first single elongated molded plastic arm consisting of a first upper curved tubular portion with a top end and a bottom end having a uniform outer diameter therebetween, a convex curved outer side facing surface and a concave curved inwardly side facing surface, a first elongated handle rearwardly extending perpendicular and molded from the top end of the first upper curved tubular portion, a straight first middle portion having a top molded to the bottom end of the first upper curved tubular portion and a bottom, the straight first middle portion having a flat front facing surface between the top and the bottom and a rearwardly facing convex curved outer surface between the top and the bottom, and a first lower curved tubular portion with a top molded to the bottom of the straight first middle portion and a bottom with a first lower rake end extending downward therefrom;

a first plastic rake head attached to the first lower rake end, the first rake head includes a first top end with a cavity which slides about the first lower rake end of the first elongated molded plastic arm, a first hole in the first top end for receiving a first rake head mounting screw to lock against the first lower rake end, the first top end fanning outward with a back having a concave curved inner side with a convex curved outer side to a first enlarged bottom end having a first plurality of spaced apart narrow diameter and short extending first tines, the first plastic rake head forming a first scoop, and a first fixed pivot point in the straight first middle portion being approximately ⅓ in distance from the top end of the first upper curved tubular portion relative to the first enlarged bottom end of the first plastic rake head, the back of the first plastic rake head forming the first scoop with three rows of parallel slots consisting of a top row of parallel curved slots stacked over a middle row of parallel vertical slots stacked over a bottom row of parallel vertical slots, the top row of parallel curved slots having a solid plastic mid space therebetween, the parallel curved slots increasing in length from adjacent to the solid mid space to side edges of the back of the first plastic rake head, the parallel curved slots being substantially uniformly spaced apart from one another with the solid plastic mid space having a generally dome shape, the middle row of parallel vertical slots being substantially shorter in length than each of the parallel curved slots, each of the parallel vertical slots of the middle row and the bottom row having a generally uniform height and a generally uniform width and a generally uniform spacing therebetween with an enlarged solid plastic mid space separating a midportion in the middle row of parallel vertical slots, the bottom row of parallel vertical slots being substantially longer in length than each slot in the middle row of parallel vertical slots and each of the parallel vertical slots in the bottom row being substantially vertical and having a substantially uniform height and a substantially width with a substantially identical spacing between each slot;

a second elongated molded plastic arm having a second S shape, the second elongated molded plastic arm consisting of a second upper curved tubular portion with a top end and a bottom end having a uniform outer diameter therebetween, a convex curved outer side facing surface, and a concave curved inwardly side facing surface, a second elongated handle rearwardly extending perpendicular and molded from the top end of the second upper curved tubular portion, a straight second middle portion having a top molded to the bottom end of the second upper curved tubular portion and a bottom, the straight second middle portion having a flat rear facing surface between the top and the bottom and front facing convex curved outer surface between the top and the bottom, and a second lower curved tubular portion with a top molded to the bottom of the straight second middle portion and a bottom with a second lower rake end extending downward therefrom;

a second plastic rake head attached to the second lower rake end, the second plastic rake head includes a second top end with a cavity which slides about the second lower rake end of the second elongated molded plastic arm, a second hole in the second top end for receiving a second rake head mounting screw to lock against the second lower rake end, the second top end fanning outward with a back having a concave curved inner side with a convex curved outer side to a second enlarged bottom end having a second plurality of spaced apart narrow diameter and short extending second tines, the second rake head forming a second scoop, and a second fixed pivot point in the straight second middle portion being approximately ⅓ in distance from the top end of the second upper curved tubular portion relative to the second enlarged bottom end of the second plastic rake head, the back of the second plastic rake head forming the second scoop with three rows of parallel vertical slots consisting of a top row of parallel curved slots stacked over a middle row of parallel vertical slots stacked over a bottom row of parallel vertical slots, the top row of parallel curved slots having a solid plastic mid space therebetween, the parallel curved slots increasing in length from adjacent to the solid mid space to side edges of the back of the second plastic rake head, the parallel curved slots being substantially uniformly spaced apart from one another with the solid plastic mid space having a generally dome shape, the middle row of parallel vertical slots being substantially shorter in length than each of the parallel curved slots, each of the parallel vertical slots of the middle row and the bottom row having a generally uniform height and a generally uniform width and generally uniform spacing therebetween with an enlarged solid plastic mid space separating a midportion in the middle row of parallel vertical slots, the bottom row of parallel vertical slots being substantially longer in length than each slot in the middle row of parallel vertical slots, and each of the parallel vertical slots in the bottom row having substantially uniform heights and widths with a substantially uniform height and a substantially uniform width with a substantially identical spacing between each slot; and a pivot mechanism consisting of a single axle screw with an enlarged head recessed in a first cavity with a first plastic washer and a single locking nut recessed in a second cavity with a second plastic washer, the pivot mechanism for pivotally attaching the first pivot point of the first elongated molded plastic arm to the second pivot point of the second elongated molded plastic arm, wherein manipulating the first elongated handle and the second elongated handle allows for the garden tool to pick up yard waste with the first plastic rake head and the second plastic rake head, wherein location of the first fixed pivot point and the second fixed pivot point each fixed pivot point being approximately ⅓ in distance from each top end of the first upper curved tubular portion and the second upper curved tubular portion enables the first plastic rake head and the second plastic rake head to expand approximately three times greater than expansion of the first elongated handle relative to the second elongated handle in order to maximize amounts of leaves and debris picked up by the first rake head and the second rake head.

2. The pivoting garden tool of claim 1, wherein the first lower curved tubular portion forms between approximately 60 degree to approximately 80 degree angle between the first lower rake end and the straight first middle portion, and the second lower curved tubular portion forms between approximately 60 degree to approximately 80 degree angle between the second lower rake end and the straight second middle portion.

3. The pivoting garden tool of claim 1, wherein the first lower curved tubular portion forms an approximately 45 degree to approximately 75 degree angle between the first lower rake end and the straight first middle portion, and the second lower curved tubular portion forms an approximately 45 degree to approximately 75 degree angle between the second lower rake end and the straight second middle portion.

4. The pivoting garden tool of claim 1, wherein each of the first tines and each of the second tines are each no longer than approximately ¾ inch in length.

5. The plastic pivoting garden tool of claim 1, wherein the single axle screw of the pivoting mechanism includes a single molded plastic axle screw.

6. A plastic molded pivoting garden tool, consisting of:
a first single elongated molded plastic arm molded into a first S shape, the first single elongated molded plastic arm consisting of a first upper curved tubular portion with a top end and a bottom end having a uniform outer diameter therebetween, a convex curved outer side facing surface and a concave curved inwardly side facing surface, a first elongated handle rearwardly extending perpendicular and molded from the top end of the first upper curved tubular portion, a straight first middle portion having a top molded to the bottom end of the first upper curved tubular portion and a bottom, the straight first middle portion having a flat front facing surface between the top and the bottom and a rearwardly facing convex curved outer surface between the top and the bottom, and a first lower curved tubular portion with a top molded to the bottom of the straight first middle portion and a bottom with a first lower rake end extending downward therefrom; and
a first plastic rake head attached to the first lower rake end, the first rake head includes a first top end with a cavity which slides about the first lower rake end of the first elongated molded plastic arm, a first hole in the first top end for receiving a first rake head mounting screw to lock against the first lower rake end, the first top end fanning outward with a back having a concave curved inner side with a convex curved outer side to a first enlarged bottom end having a first plurality of spaced apart narrow diameter and short extending first tines, the first plastic rake head forming a first scoop, and a first fixed pivot point in the straight first middle portion being approximately ⅓ in distance from the top end of the first upper curved tubular portion relative to the first enlarged bottom end of the first plastic rake head, the back of the first plastic rake head forming the first scoop with three rows of parallel slots consisting of a top row of parallel curved slots stacked over a middle row of parallel vertical slots stacked over a bottom row of parallel vertical slots, the top row of parallel curved slots having a solid plastic mid space therebetween, the parallel curved slots increasing in length from adjacent to the solid mid space to side edges of the back of the first plastic rake head, the parallel curved slots being substantially uniformly spaced apart from one another with the solid plastic mid space having a generally dome shape, the middle row of parallel vertical slots being substantially shorter in length than each of the parallel slots, each of the parallel vertical slots of the middle row and the bottom row having a generally uniform height and a generally uniform width and a generally uniform spacing therebetween with an enlarged solid plastic mid space separating a midportion in the middle row of parallel vertical slots, the bottom row of parallel vertical slots being substantially longer in length than each slot in the middle row of parallel slots and each of the parallel vertical slots in the bottom row being substantially vertical and having a substantially uniform height and a substantially width with a substantially identical spacing between each slot;

a second elongated molded plastic arm having a second S shape, the second elongated molded plastic arm consisting of a second upper curved tubular portion with a top end and a bottom end having a uniform outer diameter therebetween, convex curved outer side facing surface, and a concave curved inwardly side facing surface, a second elongated handle rearwardly extending perpendicular and molded from the top end of the second upper curved tubular portion, a straight second middle portion having a top molded to the bottom end of the second upper curved tubular portion and a bottom, the straight second middle portion having a flat rear facing surface between the top and the bottom and a front facing convex curved outer surface between the top and the bottom, and a second lower curved tubular portion with a top molded to the bottom of the straight second middle portion and a bottom with a second lower rake end extending downward therefrom;

a second plastic rake head attached to the second lower rake end, the second plastic rake head includes a second top end with a cavity which slides about the second lower rake end of the second elongated molded plastic arm, a second hole in the second top end for receiving a second rake head mounting screw to lock against the second lower rake end, the second top end fanning outward with a back having a concave curved inner side with a convex curved outer side to a second enlarged bottom end having a second plurality of spaced apart narrow diameter and short extending second tines, the second rake head forming a second scoop, and a second fixed pivot point in the straight second middle portion being approximately ⅓ in distance from the top end of the second upper curved tubular portion relative to the second enlarged bottom end of the second plastic rake head, the back of the second plastic rake head forming the second scoop with three rows of parallel vertical slots consisting of a top row of parallel curved slots stacked over a middle row of parallel vertical slots stacked over a bottom row of parallel vertical slots, the top row of parallel curved slots having a solid plastic mid space therebetween, the parallel curved slots increasing in length from adjacent to the solid mid space to side edges of the back of the second plastic rake head, the parallel curved slots being substantially uniformly spaced apart from one another with the solid plastic mid space having a generally dome shape, the middle row of parallel vertical slots being substantially shorter in length than each of the parallel curved slots, each of the parallel vertical slots of the middle row and the bottom row having a generally uniform height and a generally uniform width and generally uniform spacing therebetween with an enlarged solid plastic mid space separating a midportion in the middle row of parallel vertical slots, the bottom row of parallel vertical slots being substantially longer in length than each slot in the middle row of parallel vertical slots, and each of the parallel vertical slots in the bottom row having substantially uniform heights and widths with a substantially uniform height and a substantially uniform width with a substantially identical spacing between each slot; and a pivot mechanism consisting of a single molded plastic axle screw with an enlarged head and a plurality of plastic washers and a single locking nut for pivotally attaching the first pivot point of the first elongated molded plastic arm to the second pivot point of the second elongated molded plastic arm, wherein manipulating the first elongated handle and the second elongated handle allows for the garden tool to pick up yard waste with the first plastic rake head and the second plastic rake head, wherein location of the first fixed pivot point and the second fixed pivot point each fixed pivot point being approximately ⅓ in distance from each top end of the first upper curved tubular portion and the second upper curved tubular portion enables the first plastic rake head and the second plastic rake head to expand approximately three times greater than expansion of the first elongated handle relative to the second elongated handle in order to maximize amounts of leaves and debris picked up by the first rake head and the second rake head.

7. The plastic pivoting garden tool of claim 6, wherein the plurality of plastic washers includes:

a first plastic washer in a first recessed cavity in the first pivot point of the first elongated molded plastic arm; and a second plastic washer in a second recessed cavity in the second pivot point of the second elongated molded plastic arm, wherein the first recessed cavity and the second recessed cavity allows both the enlarged head of the single axle plastic screw and the locking nut to be countersunk within the first recessed cavity and the second recessed cavity.

8. The plastic pivoting garden tool of claim 7, wherein the first recessed cavity is a first cylindrical shaped cavity, and the second recessed cavity is a second cylindrical shaped cavity.

9. A plastic molded pivoting garden tool, consisting of:

a first single elongated molded plastic arm molded into a first S shape, the first single elongated molded plastic arm consisting of a first upper curved tubular portion with a top end and a bottom end having a uniform outer diameter therebetween, a convex curved outer side facing surface and a concave curved inwardly side facing surface, a first elongated handle rearwardly extending perpendicular and molded from the top end of the first upper curved tubular portion, a straight first middle portion having a top molded to the bottom end of the first upper curved tubular portion and a bottom, the straight first middle portion having a flat front facing surface between the top and the bottom and a rearwardly facing convex curved outer surface between the top and the bottom, and a first lower curved tubular portion with a top molded to the bottom of the straight first middle portion and a bottom with a first lower rake end extending downward therefrom;

a first plastic rake head attached to the first lower rake end, the first rake head includes a first top end with a cavity which slides about the first lower rake end of the first elongated molded plastic arm, a first hole in the first top end for receiving a first rake head mounting screw to lock against the first lower rake end, the first top end fanning outward with a back having a concave curved inner side with a convex curved outer side to a first enlarged bottom end having a first plurality of spaced apart narrow diameter and short extending first tines, the first plastic rake head forming a first scoop, and a first fixed pivot point in the straight first middle portion being approximately ⅓ in distance from the top end of the first upper curved tubular portion relative to the first enlarged bottom end of the first plastic rake head, the back of the first plastic rake head forming the first scoop with three rows of parallel slots consisting of a top row of parallel curved slots stacked over a middle row of parallel vertical slots stacked over a bottom row of parallel vertical slots, the top row of parallel curved slots having a solid plastic mid space therebetween, the parallel curved slots increasing in length from adjacent to the solid mid space to side edges of the back of the first plastic rake head, the parallel curved slots being substantially uniformly spaced apart from one another with the solid plastic mid space having a generally dome shape, the middle row of parallel vertical slots being substantially shorter in length than each of the parallel slots, each of the parallel vertical slots of the middle row and the bottom row having a generally uniform height and a generally uniform width and a generally uniform spacing therebetween with an enlarged solid plastic mid space separating a midportion in the middle row of parallel vertical slots, the bottom row of parallel vertical slots being substantially longer in length than each slot in the middle row of parallel slots and each of the parallel vertical slots in the bottom row being substantially vertical and having a substantially uniform height and a substantially width with a substantially identical spacing between each slot;

a second elongated molded plastic arm having a second S shape, the second elongated molded plastic arm consisting of a second upper curved tubular portion with a top end and a bottom end having a uniform outer diameter therebetween, convex curved outer side facing surface, and a concave curved inwardly side facing surface, a second elongated handle rearwardly extending perpendicular and molded from the top end of the second upper curved tubular portion, a straight second middle portion having a top molded to the bottom end of the second upper curved tubular portion and a bottom, the straight second middle portion having a flat rear facing surface between the top and the bottom and a front facing convex curved outer surface between the top and the bottom, and a second lower curved tubular portion with a top molded to the bottom of the straight second middle portion and a bottom with a second lower rake end extending downward therefrom;

a second plastic rake head attached to the second lower rake end, the second plastic rake head includes a second top end with a cavity which slides about the second lower rake end of the second elongated molded plastic arm, a second hole in the second top end for receiving a second rake head mounting screw to lock against the second lower rake end, the second top end fanning outward with a back having a concave curved inner side with a convex curved outer side to a second enlarged bottom end having a second plurality of spaced apart narrow diameter and short extending second tines, the second rake head forming a second scoop, and a second fixed pivot point in the straight second middle portion being approximately ⅓ in distance from the top end of the second upper curved tubular portion relative to the second enlarged bottom end of the second plastic rake head, the back of the second plastic rake head forming the second scoop with three rows of parallel vertical slots consisting of a top row of parallel curved slots stacked over a middle row of parallel vertical slots stacked over a bottom row of parallel vertical slots, the top row of parallel curved slots having a solid plastic mid space therebetween, the parallel curved slots increasing in length from adjacent to the solid mid space to side edges of the back of the second plastic rake head, the parallel curved slots being substantially uniformly spaced apart from one another with the solid plastic mid space having a generally dome shape, the middle row of parallel vertical slots being substantially shorter in length than each of the parallel curved slots, each of the parallel vertical slots of the middle row and the bottom row having a generally uniform height and a generally uniform width and generally uniform spacing therebetween with an enlarged solid plastic mid space separating a midportion in the middle row of parallel vertical slots, the bottom row of parallel vertical slots being substantially longer in length than each slot in the middle row of parallel vertical slots, and each of the parallel vertical slots in the bottom row having substantially uniform heights and widths with a substantially uniform height and a substantially uniform width with a substantially identical spacing between each slot; and a pivot mechanism consisting of a snappable axle for pivotally attaching the first pivot point of the first elongated molded plastic arm to the second pivot point of the second elongated molded plastic arm, wherein manipulating the first elongated handle and the second elongated handle allows for the garden tool to pick up yard waste with the first plastic rake head and the second plastic rake head, wherein location of the first fixed pivot point and the second fixed pivot point each fixed pivot point being approximately ⅓ in distance from each top end of the first upper curved tubular portion and the second upper curved tubular portion enables the first plastic rake head and the second plastic rake head to expand approximately three times greater than expansion of the first elongated handle relative to the second elongated handle in order to maximize amounts of leaves and debris picked up by the first rake head and the second rake head.

10. The plastic molded pivoting garden tool of claim 9, wherein the pivot mechanism includes:
 a first recessed cavity for receiving an enlarged head of the snappable axle, so the enlarged head is countersunk in the first recessed cavity; and
 a second recessed cavity for receiving an opposite end of the snapable axle, so the opposite end of the snapable axle is countersunk in the second recessed cavity.

11. The plastic molded pivoting garden tool of claim 10, wherein the pivot mechanism further includes:
 a first plastic washer in the first recessed cavity; and
 a second plastic washer in the second recessed cavity.

* * * * *